US011989771B2

(12) United States Patent
Daie et al.

(10) Patent No.: US 11,989,771 B2
(45) Date of Patent: May 21, 2024

(54) SYSTEMS AND METHODS OF GROUP ELECTRONIC COMMERCE AND DISTRIBUTION OF ITEMS

(71) Applicant: Fevo, Inc., New York, NY (US)

(72) Inventors: Ari Daie, New York, NY (US); Eric Chu, Madison, NJ (US); Roman Gun, Brooklyn, NY (US); Chinmay Bijwe, Jersey City, NJ (US); Michael McFarland, Boulder, CO (US); Dorian Bullerwell, Northglenn, CO (US); Kyle Unverferth, Lakewood, CO (US); Himanshu Kothari, New York, NY (US); Sagar Singh, Edison, NJ (US); Adeesha Ekanayake-Weber, Bayside, NY (US)

(73) Assignee: Fevo, Inc., New York, NY (US)

( * ) Notice: Subject to any disclaimer, the term of this patent is extended or adjusted under 35 U.S.C. 154(b) by 410 days.

(21) Appl. No.: 16/902,165

(22) Filed: Jun. 15, 2020

(65) Prior Publication Data
US 2020/0394705 A1    Dec. 17, 2020

Related U.S. Application Data

(60) Provisional application No. 62/861,824, filed on Jun. 14, 2019.

(51) Int. Cl.
*G06Q 30/00* (2023.01)
*G06Q 10/087* (2023.01)
*G06Q 30/0601* (2023.01)

(52) U.S. Cl.
CPC ....... *G06Q 30/0643* (2013.01); *G06Q 10/087* (2013.01); *G06Q 30/0633* (2013.01)

(58) Field of Classification Search
CPC .... G06Q 30/00; G06Q 30/06; G06Q 30/0601; G06Q 30/0623; G06Q 30/0625; G06Q 30/0633; G06Q 30/0641
See application file for complete search history.

(56) References Cited

U.S. PATENT DOCUMENTS 6,731,788 B1 * 5/2004 Agnihotri ............. G11B 27/28
382/165
7,328,176 B2 * 2/2008 Tarvydas ........... G06Q 30/0641
705/26.8

(Continued)

FOREIGN PATENT DOCUMENTS

CA    2325153    5/2002

OTHER PUBLICATIONS

Lim, Weng Marc. "Online group buying: Some insights from the business-to-business perspective." Industrial Marketing Management 65 (2017): 182-193. (Year: 2017).*

(Continued)

*Primary Examiner* — Christopher B Seibert
(74) *Attorney, Agent, or Firm* — McDonald Hopkins LLC; James P. Muraff

(57) ABSTRACT

Method and apparatus are disclosed for collective electronic commerce and distribution of items, such as fungible items/goods and non-fungible items/goods. A system manages a universal ecommerce shopping cart to facilitate creating an itinerary for a group across multiple vendor websites/applications. The systems manages inventory to interface with multiple vendors, manages groups, and/or manages the assignment of fungible items (e.g., products) and non-fungible items (e.g., tickets, access to hotel rooms, etc.) that were selected for being purchased at different times.

27 Claims, 18 Drawing Sheets

(56) References Cited

U.S. PATENT DOCUMENTS

| | | | |
|---|---|---|---|
| 7,949,572 B2 | 5/2011 | Perrochon | |
| 8,015,071 B2 | 9/2011 | Crespo | |
| 8,458,053 B1* | 6/2013 | Buron | H04N 21/4316 705/26.1 |
| 8,548,872 B1* | 10/2013 | Gupta | G06Q 30/0206 705/26.1 |
| 8,660,912 B1* | 2/2014 | Dandekar | G06Q 30/02 705/26.1 |
| 9,137,576 B2* | 9/2015 | McRae | H04N 21/47815 |
| 9,406,092 B2 | 8/2016 | Adams | |
| 9,734,530 B2 | 8/2017 | Killoran | |
| 9,760,936 B1 | 9/2017 | Shaw | |
| 9,972,038 B2 | 5/2018 | Godsey | |
| 9,990,660 B2 | 6/2018 | Gao | |
| 10,002,337 B2 | 6/2018 | Siddique | |
| 10,043,142 B2 | 8/2018 | Paleja | |
| 2002/0069108 A1 | 6/2002 | Aubertin | |
| 2003/0018499 A1* | 1/2003 | Miller | G06Q 10/02 705/5 |
| 2006/0041485 A1* | 2/2006 | Tarvydas | G06Q 30/0623 705/26.62 |
| 2006/0143094 A1* | 6/2006 | Kohout | G06Q 30/0601 705/26.1 |
| 2007/0050406 A1* | 3/2007 | Byers | G06F 16/48 |
| 2007/0106570 A1* | 5/2007 | Hartman | G06Q 30/0605 705/26.8 |
| 2007/0294240 A1* | 12/2007 | Steele | G06F 16/338 707/999.005 |
| 2008/0167946 A1* | 7/2008 | Bezos | G06Q 30/0613 705/26.1 |
| 2009/0037291 A1* | 2/2009 | Dawson | G06Q 30/0603 705/27.2 |
| 2009/0254447 A1 | 10/2009 | Blades | |
| 2009/0327129 A1 | 12/2009 | Collas | |
| 2010/0114654 A1* | 5/2010 | Lukose | G06Q 30/00 705/14.54 |
| 2011/0093361 A1* | 4/2011 | Morales | G06Q 30/0603 705/26.62 |
| 2011/0184834 A1* | 7/2011 | Perrochon | G06Q 30/0633 705/26.8 |
| 2011/0321071 A1* | 12/2011 | McRae | H04N 21/47815 725/100 |
| 2012/0136756 A1* | 5/2012 | Jitkoff | G06F 16/9577 715/224 |
| 2012/0185355 A1 | 7/2012 | Kilroy | |
| 2012/0203776 A1* | 8/2012 | Nissan | G06F 16/685 707/E17.014 |
| 2012/0226614 A1 | 9/2012 | Gura | |
| 2012/0233020 A1* | 9/2012 | Eberstadt | G06Q 30/06 705/26.1 |
| 2013/0013427 A1* | 1/2013 | Gonsalves | G06Q 30/02 705/27.1 |
| 2013/0046679 A1 | 2/2013 | Davoust | |
| 2013/0191251 A1 | 7/2013 | Martin | |
| 2014/0025521 A1* | 1/2014 | Alsina | G06Q 30/0601 705/26.1 |
| 2014/0052617 A1* | 2/2014 | Chawla | G06Q 20/102 705/39 |
| 2014/0081798 A1 | 3/2014 | Millstone-Shroff | |
| 2014/0136990 A1* | 5/2014 | Gonnen | H04L 51/18 715/752 |
| 2014/0207462 A1* | 7/2014 | Bangalore | G10L 13/08 704/260 |
| 2014/0297537 A1* | 10/2014 | Kassemi | G06Q 20/3674 705/67 |
| 2015/0032626 A1* | 1/2015 | Dill | G06Q 20/385 705/44 |
| 2015/0052061 A1* | 2/2015 | Anderson | G06Q 20/409 705/44 |
| 2015/0088686 A1* | 3/2015 | Glassberg | G06Q 50/01 705/26.8 |
| 2015/0317698 A1* | 11/2015 | Kalyvas | G06Q 30/0214 705/14.66 |
| 2016/0379194 A1 | 12/2016 | Dvir | |

OTHER PUBLICATIONS

Magnani, Alessandro, et al. "Neural product retrieval at walmart.com." Companion Proceedings of The 2019 World Wide Web Conference. 2019. (Year: 2019).*

* cited by examiner

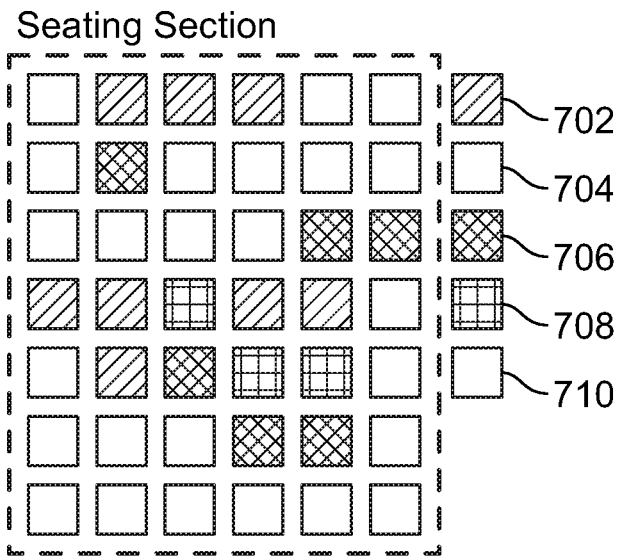
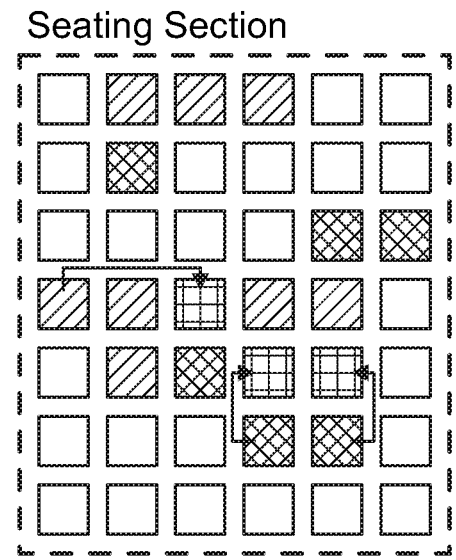
FIG. 7A  FIG. 7B
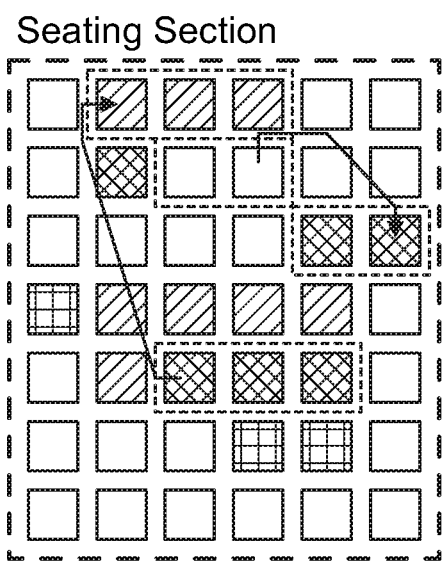
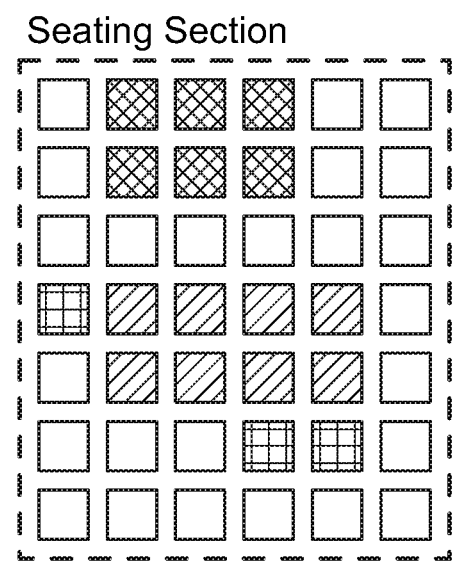
FIG. 7C  FIG. 7D

MEN˅  WOM

| REVIEW & PAY | SHARED CARTS |

<BACK

The Bride's Crew ← 1500

9 items ▲

Azazi Kaita Dress $199.99
Rust

👍 7  💬 0  ← 1504
☐ 4

Nina S OK I'm totally into this one

Caroline C Hey so I'm thinking that this one will go ← 1504
with most of our complexions WDYT?

Tanya K Oooh Love the shape but would love to
see another colour

Selena M Damn!! Love it

Comment..

A-line Off the Shoulder         $380.00
Emerald Green ← 1502
👍 2

Social Bride's Maid Dress       $125.00
Dusty Pink ← 1502
👍 1  💬 3

Mythical Kind of Love Maxi Dress  $160.00
Slate Blue ← 1502
👍 14  💬 8

Baby Doll Dress                 $160.00
Navy Blue
👍 11  💬 2

<BACK

Payment

Payment

Card Number

Exp (MM/YY) | CSW

Name on Card | Zip Code

Promo Code or Gift Voucher | Apply

Your Info

Christine | Last Name

Email | Phone (optional)

Name Your Group

Christine Super Cool Group

Check out with 1 items
You'll pay $100.00

| KEEP SHOPPING | CONFIRM |

FIG. 15

SYSTEMS AND METHODS OF GROUP ELECTRONIC COMMERCE AND DISTRIBUTION OF ITEMS

TECHNICAL FIELD

The present disclosure generally relates to systems of facilitating electronic commerce and, more specifically, group electronic commerce and distribution of items, such as products/goods/items, as well as non-fungible goods/items representing provision of or access to a service.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 7A, 7B, 7C, and 7D illustrate organizing non-fungible items for distribution when the non-fungible items for a group are selected/purchased at different times.

FIG. 15 is a further interface screen depicting a further part of the method of FIG. 12, incorporating the commerce engine of FIGS. 1 and 9.

DETAILED DESCRIPTION OF EXAMPLE EMBODIMENTS

Figure 1:
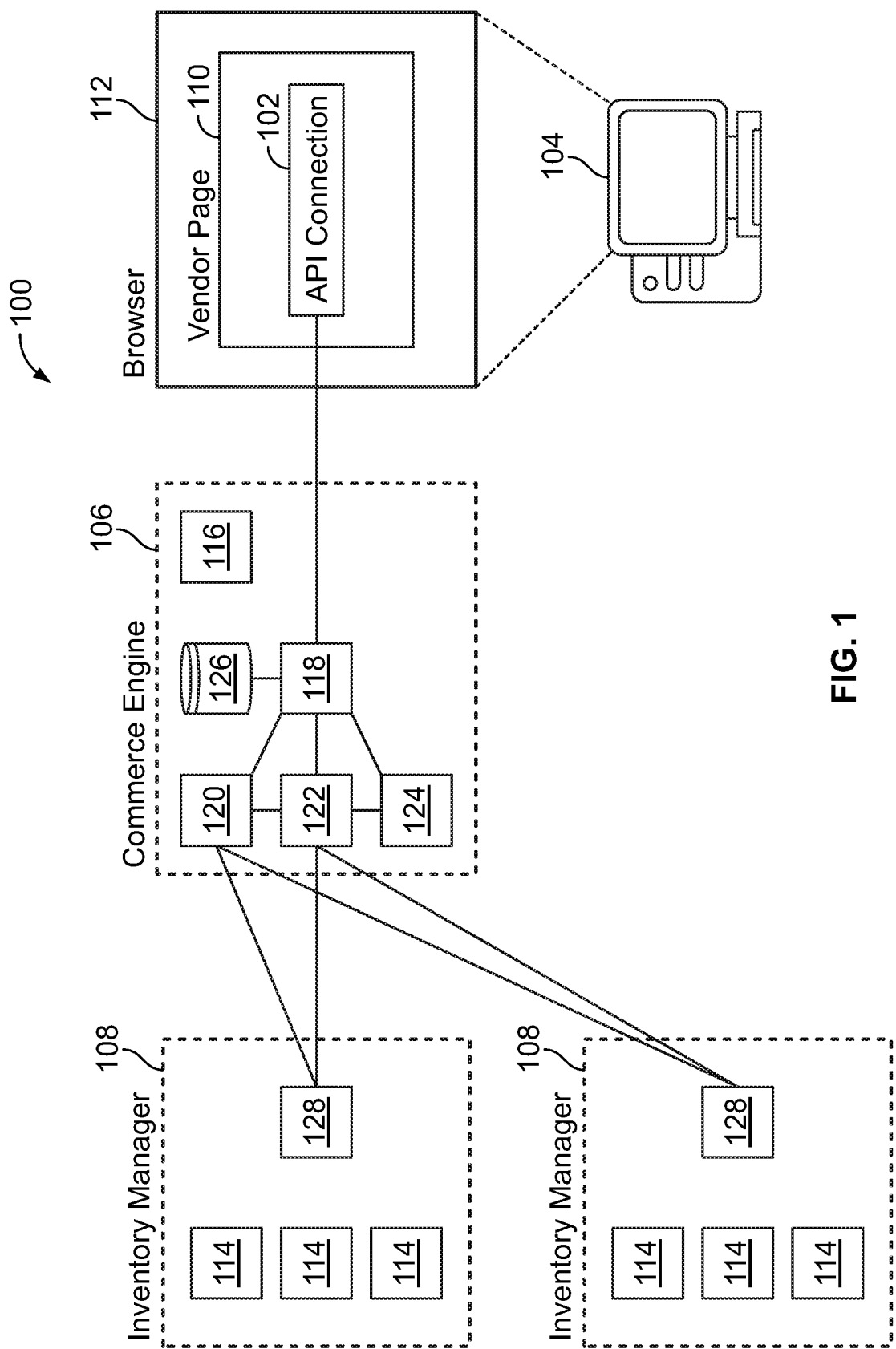
FIG. 1 is a block diagram depicting a network environment including a commerce engine operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, groups of people, such as friends and coworkers, desire to have experiences together, such as attending sporting events, traveling to exotic locations, going on cruises, and/or staying in hotels on vacation. However, traditionally organizing such experiences is difficult. Usually an organizer must get a firm headcount in advance in order to purchase elements of the experience. Then, the organizer must either collect the money in advance or front the money required to reserve the elements of the experience. These troubles persist even with the rise of mobile phone applications that facilitate interpersonal money transfers.

As described below, a system manages a universal ecommerce shopping cart to facilitate creating an itinerary for a group across multiple websites. The system manages inventory to interface with multiple vendors, manages groups, and/or manages the assignment of items/goods, such as non-fungible items (e.g., tickets, hotel rooms, access to a rental car, access to an experience, etc.), that were purchased/reserved/selected at different times. As used herein, the terms "item" and "good" should be considered interchangeable, both being capable of representing a fungible item/good, such as a product, as well as a non-fungible item/good, such as tickets to a concert, access to hotel rooms, access to rental cars, and/or access to an experience such as any other service. An operator of a website that uses the universal ecommerce shopping cart places a token into the code of their website. When a customer interacts with the ecommerce portions of the website, the token communicates, via an application programming interface (API), with a remote commerce engine to establish the personalized ecommerce shopping cart, using the associated personalized token for that customer. The commerce engine provides a graphical user interface (GUI) that presents offers affiliated with the website. When the customer adds an item/good to the universal ecommerce shopping cart, the commerce engine interfaces with the inventory management system of the website to hold and/or reserve the item/good.

As the customer adds items to the shopping cart, the commerce engine saves the state of the shopping cart with a unique identifier for that particular customer and their shopping cart. In such a manner, different versions of an itinerary for that customer can be shared as items are added, while maintaining a group of those other customers that the customer invited to the group. This unique identifier is then sharable with others. For example, a first version of the itinerary may include tickets to a concert and a second version of the itinerary may include tickets to the concert and a hotel room. In such an example, the first version may be shared with people who live in the area and the second version may be shared with people who do not live in the area. The customer may visit other websites with the embedded token and add items to the same shopping cart. The commerce engine manages the inventory (e.g., holds, releases, reserves, etc.) across multiple vendors. In one exemplary embodiment, the customer (potential customer)/purchaser (potential purchaser)/a group creator can establish a group and invite another customer (potential customer)/purchaser (potential purchaser) to join the group in the manner set forth within the present description. Specifically, when a group is created, a token is generated, which can then be shared by the customer (potential customer)/purchaser (potential purchaser)/group creator with the other customer (potential customer)/purchaser (potential purchaser), the use of which can cause the other customer (potential customer)/purchaser (potential purchaser) to become a member of the group creator's group. Offers added by members of the group can then be reviewed and selected by members of the group at different times. As used herein, the term "orderer" can include purchaser, although an orderer is broader in that a purchase does not need to be made for an order by an orderer.

When a customer creates a group, an identifier of the person is associated with the group. In such a manner, future activity of the group can be attributed to the initial customer. This can be used to reward customers that successfully attract other customers to join their group and purchase the items. In some examples, the initiator of a group is presented with various items, such as fungible and/or non-fungible goods, that are automatically added to the itinerary of the group when the group becomes a threshold size or spends a threshold amount of money. For example when the itinerary includes a concert, the initiator of the group may be presented with an option to include VIP passes that are contingent on the group consisting of at least twenty people.

When a customer visits a website with the embedded token and enters the unique identifier, the shopping cart is automatically populated with the items associated with the unique identifier. This customer may add/reserve/place on hold more items, such as goods or services, to the shopping cart (generating a new unique identifier). For example, when the initial group itinerary includes a basic hotel room, the second customer may upgrade to a larger room while still being in the group. When the customer checks out, they are placed in the group with the person that initially generated the itinerary. In some examples, a new unique identifier is then generated that is associated with the second customer so that the second customer can receive credit for successfully attracting other customers to join the group. This system facilitates forming groups around an itinerary (or group of related itineraries) with each member joining based on an invitation (e.g., they join by viewing, reserving, and/or making a purchase), where the group members pay after they join and view the contents of the cart, or as they join. The system also facilitates members joining a group at different times. This eliminates the need for the initiator of the group to provide a headcount or to front money for the group. This system works when the per person fee is fixed (e.g., each person attending a concert pays the same no matter how many people are in the group) and when the per person cost is variable (e.g., the price changes based on a number of people in a group).

In some examples, the commerce system described above is additionally used with items including fungible goods. A shared shopping cart may include both fungible and non-fungible items. When a customer checks out using the shared shopping cart, the commerce system may process the different types of items, such as fungible goods vs. non-fungible good, in a different manner. For example, the orders for the fungible goods may be fulfilled shortly after a customer checks out and the orders for the non-fungible goods may be held until a threshold time period before a date associated with the non-fungible goods, such as tickets to a concert.

In some examples, the commerce engine assigns the non-fungibles items/goods after the group has been formed. For example, the commerce engine may reserve tickets as they are bought, but not assign tickets to individuals until two days before the event. In such examples, the commerce engine uses all of the tickets for an event bought by all groups with similar characteristics (e.g., seating section, price, etc.) to optimize seating so that groups are sitting together at the event even though the tickets were bought at different times. The commerce system makes an initial assignment. The commerce platform then swaps (using unreserved non-fungible goods) and switches (using non-fungible goods reserved by the commerce engine) non-fungible goods until the non-fungible goods are in the optimal distribution (as described below). As described below, the optimal distribution is achieved when a numerical determination of overall group cohesiveness cannot be improved by further rearrangement.

In some examples, the commerce system facilitates coordination between different vendors. In some examples, a vendor may determine which offers are available or may modify offers based on the items already in the shopping cart from another vendor. In some examples, the vendor offers items in response to items already in the shopping cart from another vendor. For example, if tickets to a sporting event are already in the shopping cart, the vendor may offer apparel that is only available to customers who are also purchasing the tickets. In some examples, the vendor modifies offers in response to items already in the shopping cart from another vendor. For example, if tickets to a sporting event are already in the shopping cart, the vendor may offer a discount on any apparel associated with the team associated with the event. In some examples, a vendor offers are available or may modify offers based on a customer's interactions with other vendors. For example, if a customer adds an item to the shopping cart and then removes it at a first vendor, the second vendor may offer a similar item at a discount.

In the commerce flow as described below, account creation is not required. The system is able to track anonymous users adding items to a shopping cart, maintain connections between items being added by the corresponding anonymous (sometimes referred to as "viewers") or known users, and generate and/or maintain the connections correctly once purchases are made by the anonymous users.

FIG. 1 is a block diagram depicting a network environment 100 operating in accordance with the teachings of this disclosure. The network environment 100 includes a token 102 executing on a computing device 104 (e.g., a desktop computer, a laptop computer, a tablet, a smartphone, a smartwatch, etc.), a commerce engine 106, and one or more inventory managers 108. The network environment 100 operates to provide collective electronic commerce and distribution of non-fungible goods.

The token 102 is code that is embedded in a vendor webpage 110 that is executed by browser 112 running on the computing device 104 of a customer. In some examples, the token 102 is an HTML, iFrame tag that links to a single-page application (SPA) to (a) dynamically rewrite the vendor webpage 110 to provide a universal shopping cart, and (b) communicate with the commerce engine 106 via an application programming interface (API) (e.g., a set of functions that facilitate access to resources of computer, process, application, or server). Through the vendor webpage 110 as modified through the token 102, the customer interacts with the commerce engine 106. The computing device 104 is a device that can execute a web browser (e.g., a browser based on HTML 5, etc.) that can execute scripts on a webpage.

As described below, the commerce engine 106 communicates with the computing device 104 via the token 102 to manage the universal shopping cart, manage inventory of vendors 114, and manage distribution of non-fungible items. In the illustrated example, the commerce engine 106 includes a web manager 116, a gateway 118, an offer manager 120, an order manager 122, a user manager 124, and a commerce database 126. The web manager 116, the gateway 118, the offer manager 120, the order manager 122, and the user manager 124 are independently instantiated executables that run on virtual instances of operating environments (e.g., virtual machines, containers, etc.). The web manager 116, the gateway 118, the offer manager 120, the order manager 122, and the user manager 124 use APIs to request and communicate data to each other. The commerce database 126 is one or more databases (e.g., a relational database, a graph database, etc.) that store information on individual customers, orders, allocations of non-fungible items, and groups.

The web manager 116 manages the web code being served to the browser 112 viewing the vendor page 110. The gateway 118 manages interactions between the customer and the other components of the commerce engine 106. For example, the gateway 118 may retrieve offers from the offer manager 120 and profile information of the current customer from the commerce database to server to the browsers 112 via the token 102. The offer manager 120 communicates, via an API, with the inventory managers 108 to retrieve offers (e.g., available non-fungible goods) available to the customer. The order manager 122 communicates with the inventory managers 108 to manage ordering the non-fungible goods (e.g., temporarily placing available items on hold, reserving goods, allocating goods, etc.). The user manager 124 manages information related to the customers and groups (e.g., group composition, user profiles, commerce attribution, etc.).

The inventory manager 108 includes a vendor manager 128 that manages communication between the commerce engine 106 and the inventory manager systems of the vendors 114. In the illustrated example, the inventory managers 108 are separated into managing different types of items. For example, a first inventory manager 108 may interface with the inventory management systems of event vendors, a second inventory manager 108 may interface with the inventory management systems of hotels, and a third inventory manager 108 may interface with the inventory management systems of airlines. The vendor manager 128 operates to translate between the offer manager 120 and the order manager 122 so that the offer manager 120 and the order manager 122 do not need specific protocols to access the data from the individual inventory management systems of the vendors (e.g., to provide, from the perspective of the commerce engine 106, a universal inventory management system).

When a customer visits a vendor page 110 that includes the token 102, the web manager 116 provides a graphical interface for the universal shopping cart, the offer manager 120 retrieves offers associated with the vendor page 110, and the user manager 124 retrieves customer information (if available). When one of the offers is added to the universal shopping cart, the order manager 122 places a hold on the non-fungible items with the associated inventory manager 128. The inventory manager 128 then changes the status of the non-fungible items in the inventory management system of the corresponding vendor 114 to a "hold status" (e.g., a temporary state where a specific non-fungible item will be not offered to other customers). Additionally, the user manager 124 generates a unique identifier for the universal shopping cart that relates to the present state of the universal shopping cart.

When the customer buys the non-fungible item(s) in the shopping cart, the order manager 122 reserves the non-fungible item with the associated inventory manager 128. The inventory manager 128 then changes the status of the non-fungible good in the inventory management system of the corresponding vendor 114 to a "reserved status." In some examples, the order manager 122 then allocates (e.g., provides the detailer of the purchaser to the vendor of the non-fungible good(s)) the non-fungible goods. Alternatively, in some examples, the order manager 122 reserves the non-fungible items, but does not allocate them to a specific individual while tracking the characteristics (e.g., location, price, etc.) of the non-fungible item. The user manager 124 forms a group and associate the purchaser with the group. The user manager 124 provides the purchaser with a link to share the universal shopping cart. Subsequent purchasers that used the link are added to the group.

At a threshold time (e.g., two days, etc.) before a date associated with the non-fungible items associated with a group, the order manager 122 allocates or reallocates the non-fungible items to members of the respective groups. Using non-fungible items that have similar characteristics between all of the groups, the order manager 122 allocates or reallocates the non-fungible items to optimize distribution so that members of the same group are located close to each other. For example, the order manager 122 may allocate seats to a soccer game so that members of each of the groups are seated together or may allocate rooms in a hotel so that the rooms being used by a group are in proximity of each other.

Inventory Management

Figure 2:
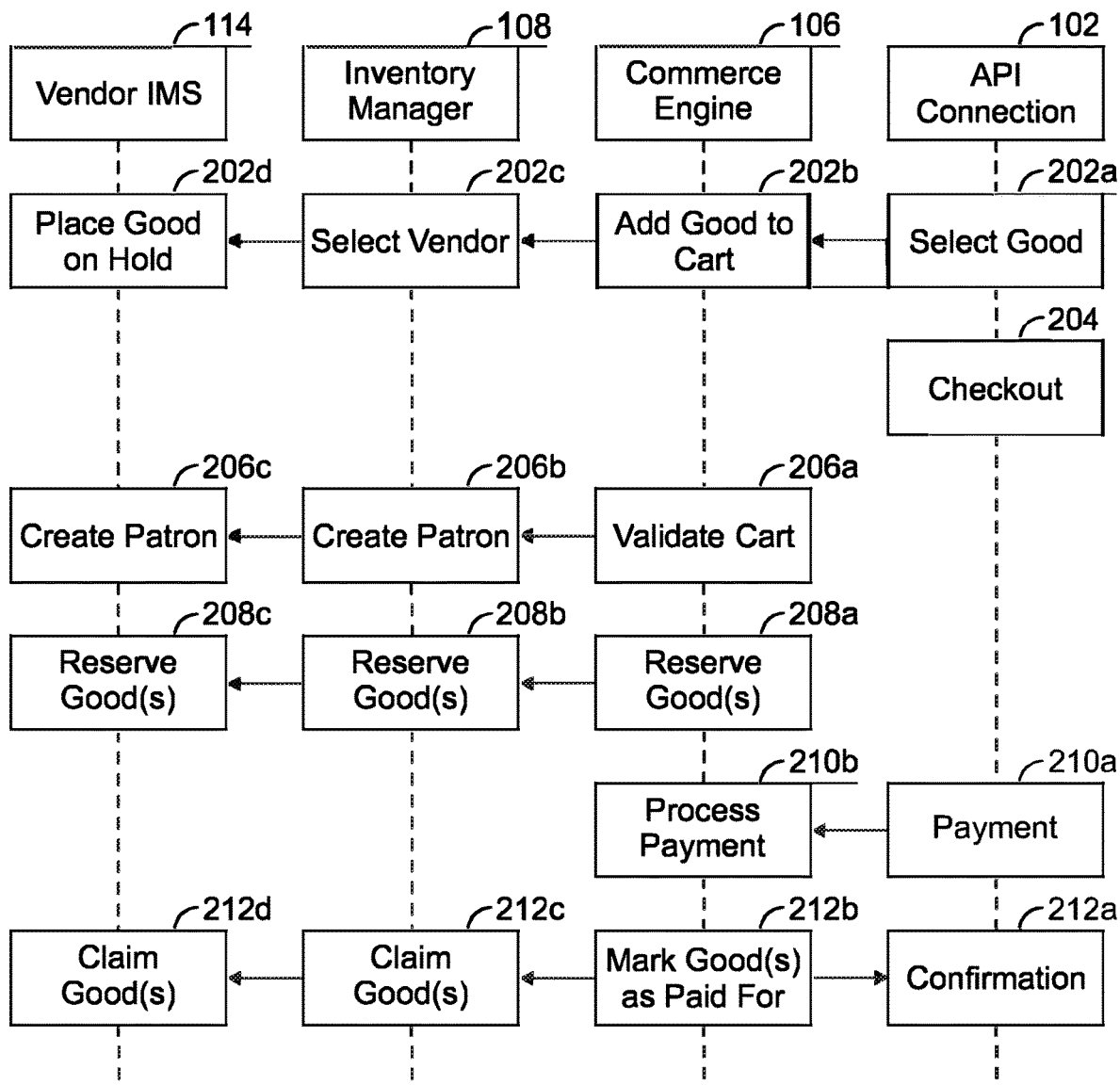
FIG. 2 is a block diagram of an inventory management system incorporating the commerce engine of FIG. 1 to facilitate group universal shopping cart and distribution of items.

FIG. 2 is a block diagram of an inventory management system incorporating the commerce engine 106 and the inventory manager 108 of FIG. 1 to facilitate group universal shopping and distribution of items. The diagram begins when a customer has visited the vendor webpage 110 and opened the universal shopping cart.

At block 202a, when the customer selects one or more items from an offer of items on a vendor webpage, the token 102 communicates that selection to the commerce engine 106. At block 202b, the commerce engine 106 sends a message to the inventory manager 108 associated with the vendor to add the selected tickets to the cart. At block 202c, the inventory manager 108 instructs the inventory management system 114 of the vendor to change a status of the items in the inventory management system 114 to a "hold status," which prevents the items from being included in an offer. At block 202d, the inventory management system 114 of the vendor changes the status of the item to "hold." In some examples, the "hold status" may be set to expire (a) when the inventory manager 108 sends a message that the universal shopping cart has been abandoned and/or (b) after a threshold period of time (e.g., five minutes, ten minutes, etc.). The inventory management system 114 of the vendor may return a status error if the item is not available (e.g., has the status of "hold," "reserved," or "claimed").

At block 204, the token 102 communicates that the customer has selected to purchase the item(s) in the universal shopping cart.

At block 206a, the commerce engine 106 requests that the inventory manager 108 validate the item(s) in the universal shopping cart (e.g., check to ensure that the item(s) exist and do not have a "hold" or "reserved" status). At block 206b, the inventory manager creates the patron (e.g., creates or receives an account with an identifier of the purchaser). At block 206c, the inventory management system 114 of the vendor also creates the patron.

At block 208a, the commerce engine 106 sends a message to the inventory manager 108 associated with the vendor to change the status of the tickets to a "reserved status." At block 208b the inventory manager 108 instructs the inventory management system 114 of the vendor to place change a status of the goods in the inventory management system 114 to a "reserve status," which prevents the goods from being included in an offer and does not expire unless the inventory manager 108 requests that the status be changed. At block 208c, the inventory management system 114 of the vendor changes the status of the item to "reserved."

At block 210a, the token 102 indicates that the customer is paying for the items. At block 210b, the commerce engine 106 processes the payment (e.g., via a third party payment processor). If the payment is not successful, the commerce engine 106 sends a message to the inventory manager 108 to change to the status of the items to "available."

At block 212a, when the payment has been successfully processed, the token 102 displays a confirmation screen to the consumer via the vendor webpage 110. At block 212b, the commerce engine 106 marks the item(s) as paid for and associates the good(s) or the characteristics of the item(s) to the purchaser. At block 212c, the inventory manager 108 instructs the inventory management system 114 of the vendor to change the status of the item(s) to "claimed." In some examples, the inventory manager 108 indicates that the patron is to be associated with the item(s). At block 212d, the inventory management system 114 of the vendor changes the status of the good to "claimed."

Group Universal Shopping Cart

Figure 3:
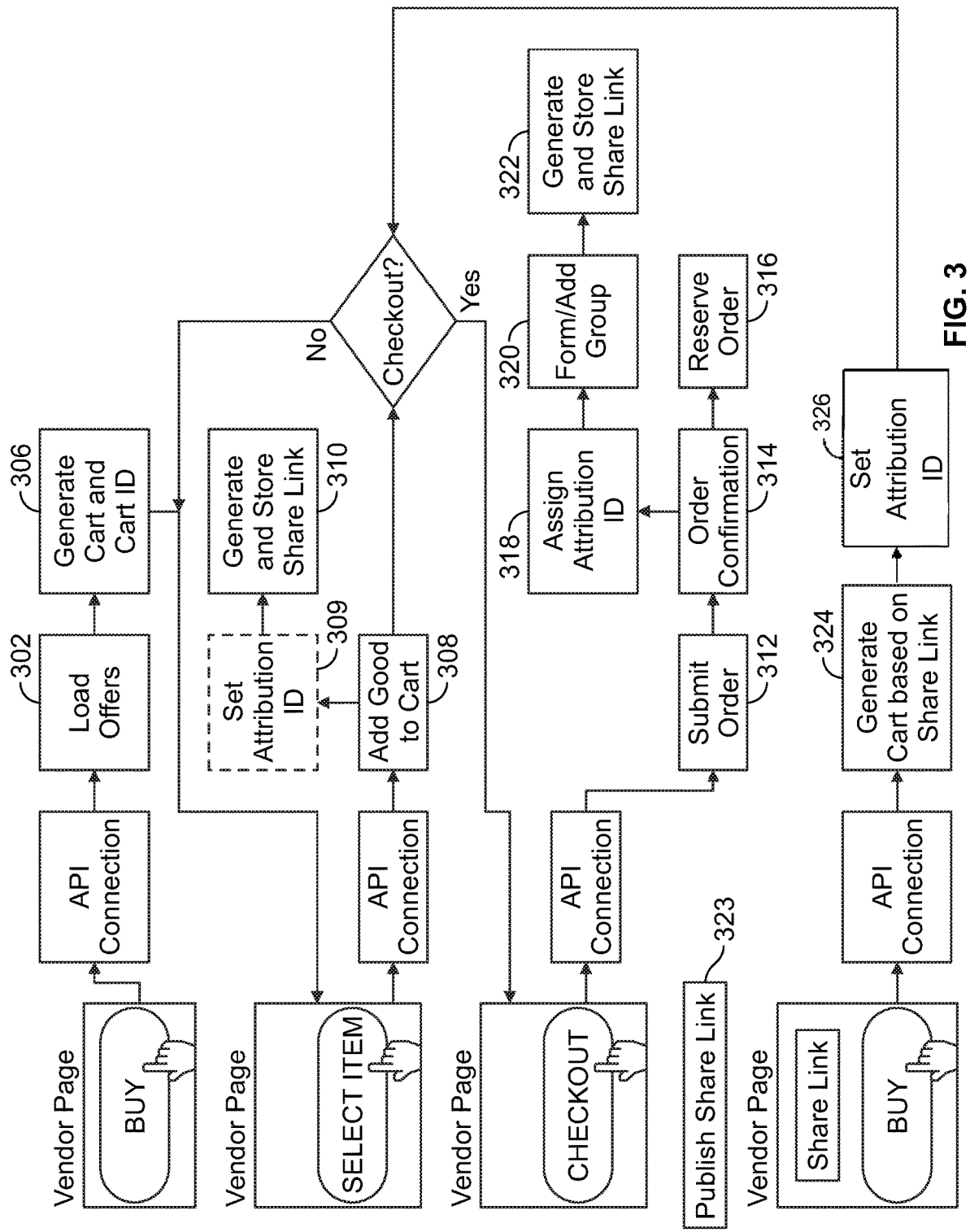
FIGS. 3, 4 and 5 are block diagrams of a group universal shopping cart system incorporating the commerce engine of FIG. 1 to facilitate group sharing of a universal shopping cart.
Figure 4:
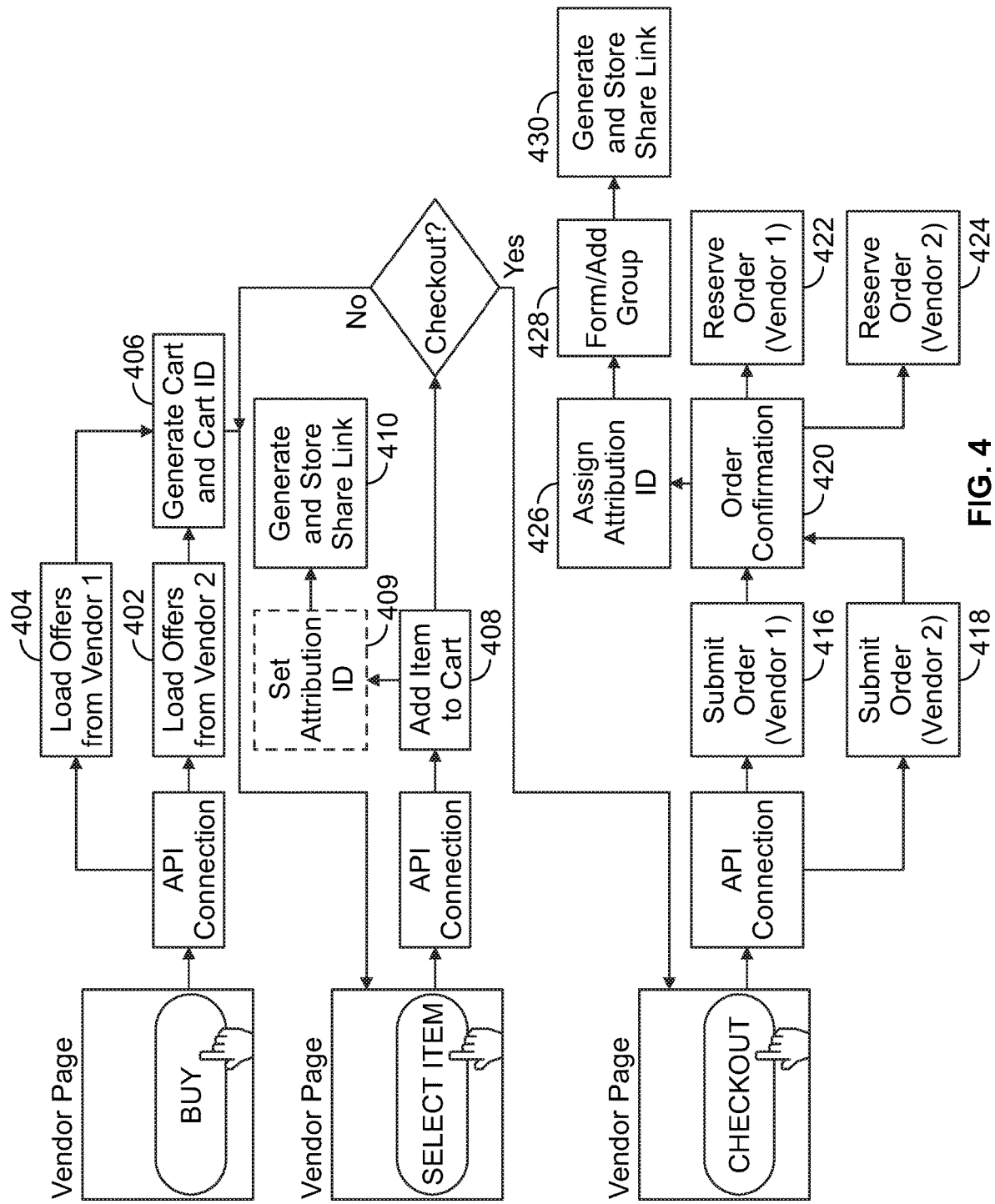
Figure 5:
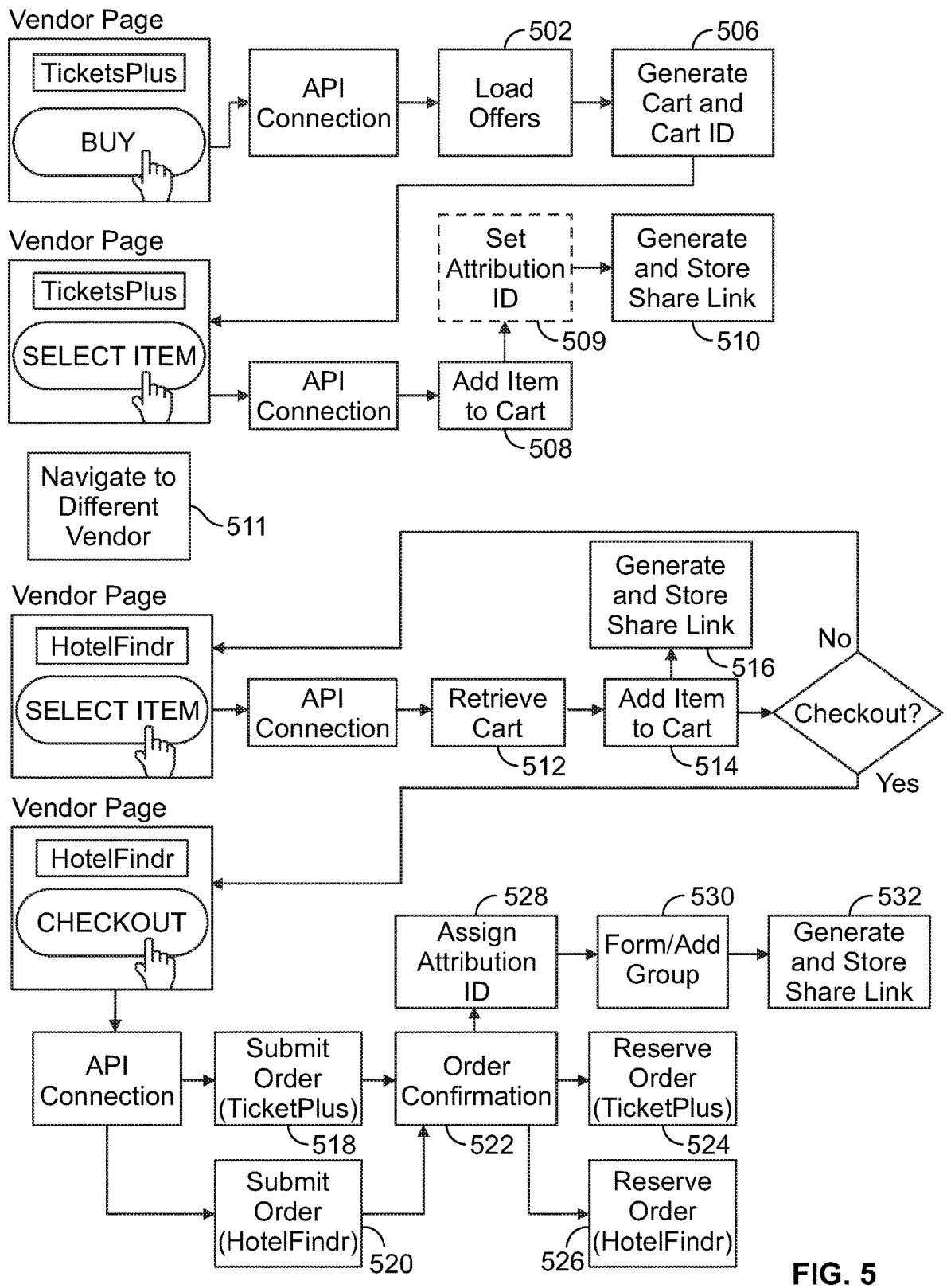

FIGS. 3, 4, and 5 are block diagrams of a group universal shopping cart system incorporating the commerce engine 106 of FIG. 1 to facilitate sharing a universal shopping cart. Generally, FIGS. 3 and 4 illustrate different states of the vendor webpage 110 as modified by the webpage manager 116 and actions performed by the commerce engine 106.

As illustrated in FIG. 3, the customer indicates (e.g., clicks on a button) that they intend to initiate a shopping cart. The commerce engine 106 receives that indication through the API connection 102. The commerce engine 106 loads offers from the inventory management system(s) 114 of the related vendor (block 302). The commerce engine 106 generates an empty cart and a cart identifier (ID) (block 306).

The customer selects an item to add to the cart. The commerce engine 106 receives that indication through the API connection 102. The commerce engine 106 adds the item to the shopping cart (block 308). If the item added at block 308 is the first good added to the shopping cart by that particular customer, the commerce engine sets a temporary attribution ID to associate the actions involving the shopping cart with that customer (block 309). The commerce engine generates and stores a unique identifier (sometimes referred to as a "share link") that represents the cart, the attribution ID, and the current item(s) within the cart (block 310).

The customer selects to check out. The commerce engine 106 receives that indication through the API connection 102. The commerce engine 106 submits the order for the item(s) in the shopping cart (e.g., as described above) (block 312). The commerce engine 106 confirms the order by processing the payment and notifying the customer (e.g., sends a confirmation to the vendor webpage 110) (block 314). In some examples, during this process, the commerce engine 106 identifies the customer and/or associates the customer with an identifier in the commerce database 116. For example, the commerce engine 106 may ask for the customer's credentials during payment processing and/or may retrieve a token from the computer 104 (such as, a cookie). The commerce engine 106 instructs the inventory manager 108 to reserve the items in the order (block 316). The commerce engine 106 set the attribution ID to the identifier of the customer (block 318). Setting the attribution identifier connects previously generated unique tokens (e.g., the tokens generated at block 310) to the customer. The commerce engine 106 then forms a group (e.g., generates a group ID and related metadata) or adds the customer to a group (block 320). The commerce engine 106 forms the group when the customer is the first customer in the group. The commerce engine 106 adds to the group when the customer used a shared link to access the shopping cart. In some examples, the commerce engine 106 credits the group, in the group metadata, with a reward quantity (e.g., a number of customers in a group to determine eligibility for contingent items in the cart) and with an amount of money spent for the items in the shopping cart. The commerce engine 106 generates and stores a unique token that represents the final state of the shopping cart (block 322).

The customer (e.g., the original customer or a subsequent customer that uses a share link) may then publish the share link (block 323). As used herein, "publish the share link" refers to communicating the share link over an electronic communication medium, such as social media, e-mail, SMS message, etc. For example, after checking out, the GUI may present a button that publishes the share link with a description of the items in the shopping cart on one or more of the customer's social media (e.g., Twitter®, Instagram®, etc.).

When a second customer uses one of the share links (e.g., the share links generated at block 310 and/or block 322 published at block 323), the share link is communicated to the commerce engine 106 via the API connection 102. The commerce engine 106 then generates a shopping cart based on the share link (block 324). The commerce engine 106 generates the shopping cart based on current availability of inventory. If some items cannot be added to the invitee's cart (e.g., no more inventory of that item), that item is not added into the invitee's shopping cart. If no item can be added, the commerce engine 106 provides the invitee with relevant alternative items (e.g., tickets for seating in an adjacent section, etc.). Because the second customer is interacting with a shopping cart that has at least one item in it, the commerce engine 106 sets an attribution ID for the second customer (block 326). The second customer can then check out as described above and/or further modify the shopping cart as provided above. Because the second customer used a share link provided by a first customer, the second customer is added to the group with the first customer and the purchases in the shopping cart are attributed to the first customer. The first customer gets credit for the purchases of the second customer. The second customer can then share a different share link and get credit when another customer uses that link, etc. In one exemplary embodiment, the customer (potential customer)/purchaser (potential purchaser)/a group creator can establish a group and invite another customer (potential customer)/purchaser (potential purchaser) to join the group in the manner set forth within the present description. Specifically, when a group is created, a token is generated by the commerce engine 106, which can then be shared by the customer (potential customer)/purchaser (potential purchaser)/group creator with the other customer (potential customer)/purchaser (potential purchaser), the use of which can cause the other customer (potential customer)/purchaser (potential purchaser) to become a member of the group creator's group, as set forth herein. Offers added to the cart by members of the group through the commerce engine 106 can then be reviewed and selected by members of the group at different times, also through the commerce engine 106 via the computing devices 104, 104a, 104b.

FIG. 4 illustrates forming a shopping cart with multiple vendors. In the illustrated example, the vendor page is associated with more than one vendor. For example, the vendor page may be an experience aggregator that provides items from different vendors to facilitate planning group events. As another example, the vendor page may be affiliated with one vendor (e.g., a hotel, etc.), but may be granted access to sell items by another vendor (e.g., a concert venue near the hotel, etc.). The customer indicates (e.g., clicks on a button) that they intend to initiate a shopping cart at a webpage or App of the vendor. The commerce engine 106 receives that indication through the API connection 102. The commerce engine 106 loads offers from the inventory management system(s) 114 of the first vendor. The commerce engine 106 also loads offers from the inventory management system(s) 114 of the second vendor (block 402). The commerce engine 106 generates an empty cart and a cart ID (block 406).

The customer selects an item to add to the cart. The commerce engine 106 receives that indication through the API connection 102. The commerce engine 106 adds the item to the shopping cart (block 408). If the item added at block 408 is the first item added to the shopping cart by that particular customer, the commerce engine sets a temporary attribution ID to associate the actions involving the shopping cart with that customer (block 409). The commerce engine generates and stores a unique identifier that represents the cart, the attribution ID, and the current item(s) within the cart (block 410).

The customer selects to check out. The commerce engine 106 receives that indication through the API connection 102. The commerce engine 106 submits the order for the item(s) in the shopping cart (e.g., as described above) associated with the first vendor to the inventory management system 114 of the first vendor (block 416). The commerce engine 106 submits the order for the item(s) in the shopping cart (e.g., as described above) associated with the second vendor to the inventory management system 114 of the second vendor (block 418). The commerce engine 106 confirms the order by processing the payment and notifying the customer (e.g., sends a confirmation to the vendor webpage/App 110) (block 420). In some examples, during this process, the commerce engine 106 identifies the customer and/or associates the customer with an identifier in the commerce database 116. For example, the commerce engine 106 may ask for the customer's credentials during payment processing and/or may retrieve a token from the computer 104 (such as, a cookie). The commerce engine 106 instructs the inventory manager 108 to reserve the corresponding items in the order with the inventory management system 114 of the first vendor (block 422). The commerce engine 106 instructs the inventory manager 108 to reserve the corresponding items in the order with the inventory management system 114 of the second vendor (block 424). The commerce engine 106 set the attribution ID to the identifier of the customer (block 426). Setting the attribution identifier connects previously generated unique tokens (e.g., the tokens generated) at block 410) to the customer. The commerce engine 106 then forms a group (e.g., generates a group ID and related metadata) or adds the customer to a group (block 428). The commerce engine 106 generates and stores a unique token that represents the final state of the shopping cart (block 430).

FIG. 5 illustrates forming a shopping cart with multiple vendors. The customer indicates (e.g., clicks on a button) that they intend to initiate a shopping cart at a webpage/App of a first vendor. The commerce engine 106 receives that indication through the API connection 102. The commerce engine 106 loads offers from the inventory management system(s) 114 of the related vendor (block 502). The commerce engine 106 generates an empty cart and a cart ID (block 506).

The customer selects an item to add to the cart. The commerce engine 106 receives that indication through the API connection 102. The commerce engine 106 adds the item to the shopping cart (block 508). If the good added at block 408 is the first item added to the shopping cart by that particular customer, the commerce engine sets a temporary attribution ID to associate the actions involving the shopping cart with that customer (block 509). The commerce engine generates and stores a unique identifier that represents the cart, the attribution ID, and the current item(s) within the cart (block 510).

The customer may then navigate the vendor webpage App of a second vendor (block 511). The customer selects a good to add to the cart from the second vendor. The commerce engine 106 receives that indication through the API connection 102. The commerce engine 106 adds the item to the shopping cart (block 512). The commerce engine generates and stores a unique identifier (sometimes referred to as a "share link") that represents the cart, the attribution ID, and the current item(s) within the cart (block 514). The commerce engine generates and stores a unique identifier that represents the cart, the attribution ID, and the current item(s) within the cart (block 516).

The customer selects to check out. The commerce engine 106 receives that indication through the API connection 102. The commerce engine 106 submits the order for the item(s) in the shopping cart (e.g., as described above) associated with the first vendor to the inventory management system 114 of the first vendor (block 518). The commerce engine 106 submits the order for the item(s) in the shopping cart (e.g., as described above) associated with the second vendor to the inventory management system 114 of the second vendor (block 520). The commerce engine 106 confirms the order by processing the payment and notifying the customer (e.g., sends a confirmation to the vendor webpage/App 110) (block 522). In some examples, during this process, the commerce engine 106 identifies the customer and/or associates the customer with an identifier in the commerce database 116. For example, the commerce engine 106 may ask for the customer's credentials during payment processing and/or may retrieve a token from the computer 104 (such as, a cookie). The commerce engine 106 instructs the inventory manager 108 to reserve the corresponding items in the order with the inventory management system 114 of the first vendor (block 524). The commerce engine 106 instructs the inventory manager 108 to reserve the corresponding items in the order with the inventory management system 114 of the second vendor (block 526). The commerce engine 106 set the attribution ID to the identifier of the customer (block 528). Setting the attribution identifier connects previously generated unique tokens (e.g., the tokens generated at block 510 and block 516) to the customer. The commerce engine 106 then forms a group (e.g., generates a group ID and related metadata) or adds the customer to a group (block 530). The commerce engine 106 generates and stores a unique token that represents the final state of the shopping cart (block 532).

Distribution of Non-Fungible Items

Figure 6:
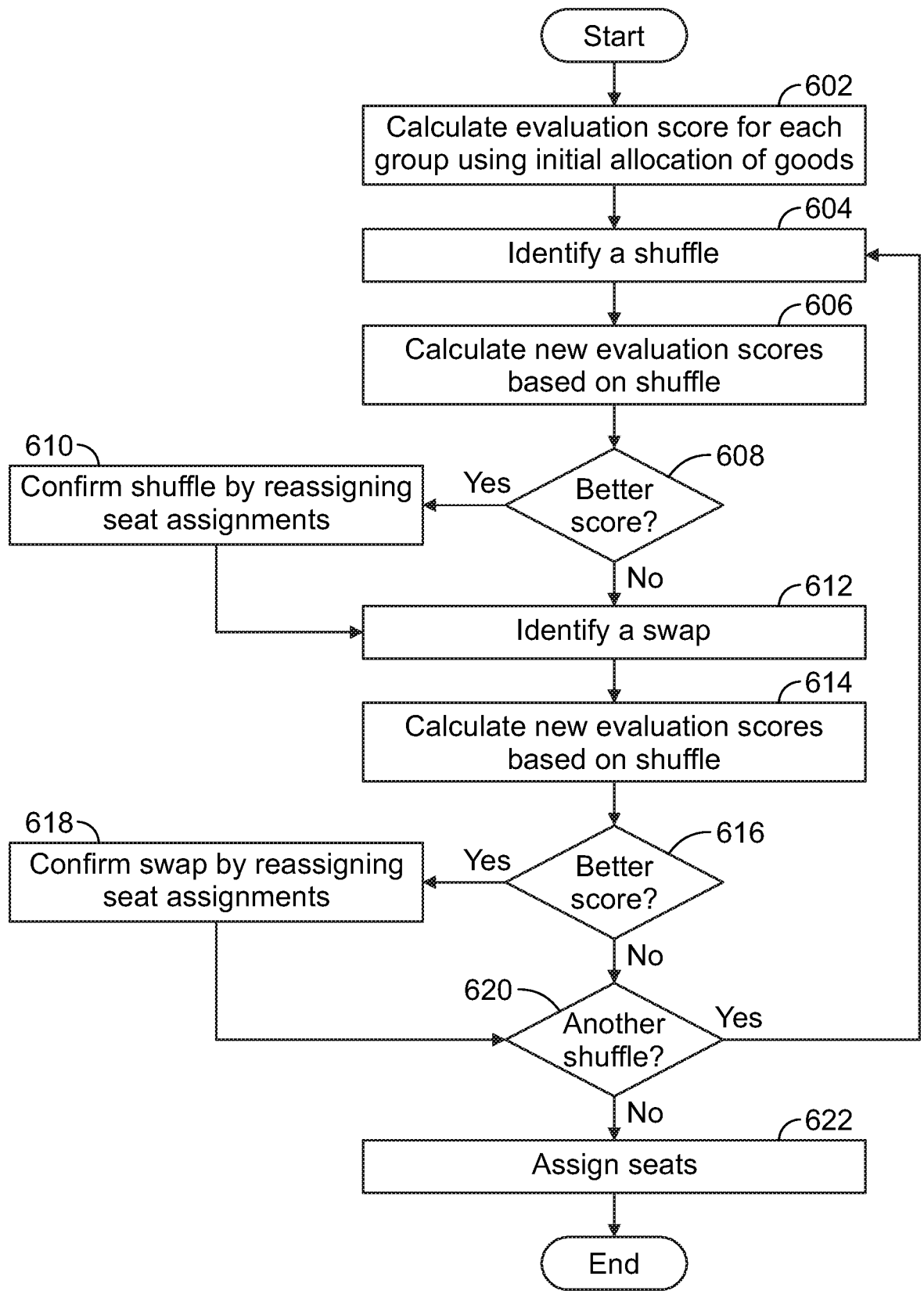
FIG. 6 is a flowchart of a method to distribute non-fungible items incorporating the commerce engine of FIG. 1.

FIGS. 6, 7A, 7B, 7C, and 7D illustrate examples of optimizing the distribution of non-fungible items. FIG. 6 is a flowchart of a method to distribute non-fungible items incorporating the commerce engine 106 of FIG. 1. As used herein, a "swap" is a process by which the commerce engine 106, via the relevant inventory manager 108, exchanges a claimed good with an available item (e.g., an item that does not have a "hold," "reserved," or "claimed" status) that has similar characteristics. As used herein, a "shuffle" is a process by which the commerce engine 106 switches items with similar characteristics between groups. These "Swap" and "shuffle" processes are invoked for those items for which the physical location of the item is pivotal to how the item is consumed, and where groups typically have more enjoyment consuming items whose locations are adjacent to each other. For example, seats at an arena and hotel rooms are non-fungible items for which the "shuffle" and "swap" processes are used to distribute the items to groups.

Initially, at block 602, the commerce engine 106 calculates an evaluation score ($S_E$) for each relevant group based on initial allocation of items with similar characteristics between groups. For example, when the items are tickets with corresponding seats at an event, the relevant groups may be the groups with members sitting in the same seating section. Each item in a group is assigned an adjacency score ($S_A$). The adjacency score ($S_A$) is a measurement of how connected the item is to the other items in the group. In some examples in which the items are tickets with corresponding seats at an event, the adjacency score ($S_A$) is a number of cardinally adjacent (sometimes referred to as "Orthogonally Adjacent" or "Edge Adjacent") seats that will not be occupied by a member of the group. In such examples, the adjacency score ($S_A$) is between zero and four. For each group, the evaluation score ($S_E$) is calculated in accordance with Equation (1) below.

$$S_E = (N_R \times W_R) + \frac{(\sum S_A \times W_A)}{N_S} \quad \text{Equation (1)}$$

In Equation (1) above, $N_R$ is the number of rows that will be occupied by members of the group, $W_R$ is a row weight, $\sum S_A$ is the sum of the adjacency score ($S_A$) of the seats that will be occupied by the members of the group, $W_A$ is a seat adjacency weight, and $N_S$ is a number of seats that will be occupied by members of the group. In some examples, the row weight ($W_R$) is three and the seat adjacency weight ($W_A$) is one. Generally, when the row weight ($W_R$) is larger than the seat adjacency weight ($W_A$), the penalty for being in different rows is greater than the penalty for sitting next to fewer members of the group. Generally, a lower evaluation score ($S_E$) is better than a higher evaluation score ($S_E$).

At block 604, the commerce engine 106 identifies a shuffle between two groups. At block 606, the commerce engine 106 calculates the new evaluation score ($S_E$) for each of the affected groups. At block 608, the commerce engine 106 determines whether the new aggregated evaluation score ($S_E$) (between the affected groups) is better (e.g., lower, etc.) than the previous aggregated evaluation score ($S_E$). If the new aggregated evaluation score ($S_E$) is better, the method continues to block 610. Otherwise, if the new aggregated evaluation score ($S_E$) is not better, the method continues to block 612. At block 610, the commerce engine 106 reassigns the goods between the groups.

At block 612, the commerce engine 106 identifies a shuffle between two groups. At block 614, the commerce engine 106 calculates the new evaluation score ($S_E$) for each of the affected groups. At block 616, the commerce engine 106 determines whether the new aggregated evaluation score ($S_E$) (between the affected groups) is better (e.g., lower, etc.) than the previous aggregated evaluation score ($S_E$). If the new aggregated evaluation score ($S_E$) is better, the method continues to block 618. Otherwise, if the new aggregated evaluation score ($S_E$) is not better, the method continues to block 620. At block 618, the commerce engine 106 reassigns the items between the groups.

At block 620, the commerce engine 106 determines whether to perform another shuffle. In some examples, the commerce engine 106 determines to perform another shuffle when either (a) the most recent shuffle resulted in a reassignment or (b) the last swap resulted in a seat reassignment. The commerce engine 106 determines not to perform another shuffle when neither the last shuffle nor the last swap resulted in a seat reassignment. When the commerce engine 106 determines to perform another shuffle, the method returns to block 604. Otherwise, when the commerce engine 106 determines not to perform another shuffle, the method continues to block 622.

At block 622, the commerce engine 106, via the corresponding inventory manager 108, assigns the seats to members of the respective groups (e.g., assigns which member of the group is associated with a particular item). While the method as illustrated in FIG. 6 includes a set of steps for a shuffle, followed by a set of step for a swap, the shuffle and swap steps may be done in any order (e.g., a swap, a shuffle, and a swap, etc.).

FIGS. 7A, 7B, 7C, and 7D illustrate an example of optimizing seating within groups within a same seating section. FIGS. 7A, 7B, 7C, and 7D illustrate seats associated with a first group 702, seats associated with a second group 704, seats associated with a third group 706, seats that are available 708, and seats which are not available 710. FIG. 7A illustrates the group seating before the optimization. In FIG. 7A, the first group 702 as an evaluation score (SE) of 11.25, the second groups has an evaluation score ($S_E$) of 8.00, and the third group has an evaluation score ($S_E$) of 15.17. FIG. 7B illustrates three swaps. After the swap illustrated in FIG. 7B, the first group 702 as an evaluation score ($S_E$) of 11.00, the second groups has an evaluation score ($S_E$) of 8.00, and the third group has an evaluation score ($S_E$) of 11.83. FIG. 7C illustrates proposed shuffles of multiple seats. FIG. 7D illustrates the seating after the shuffles of FIG. 7C. In FIG. 7D, the first group 702 as an evaluation score ($S_E$) of 7.5, the second group has an evaluation score ($S_E$) of 5.25, and the third group has an evaluation score ($S_E$) of 7.17.

Figure 8:
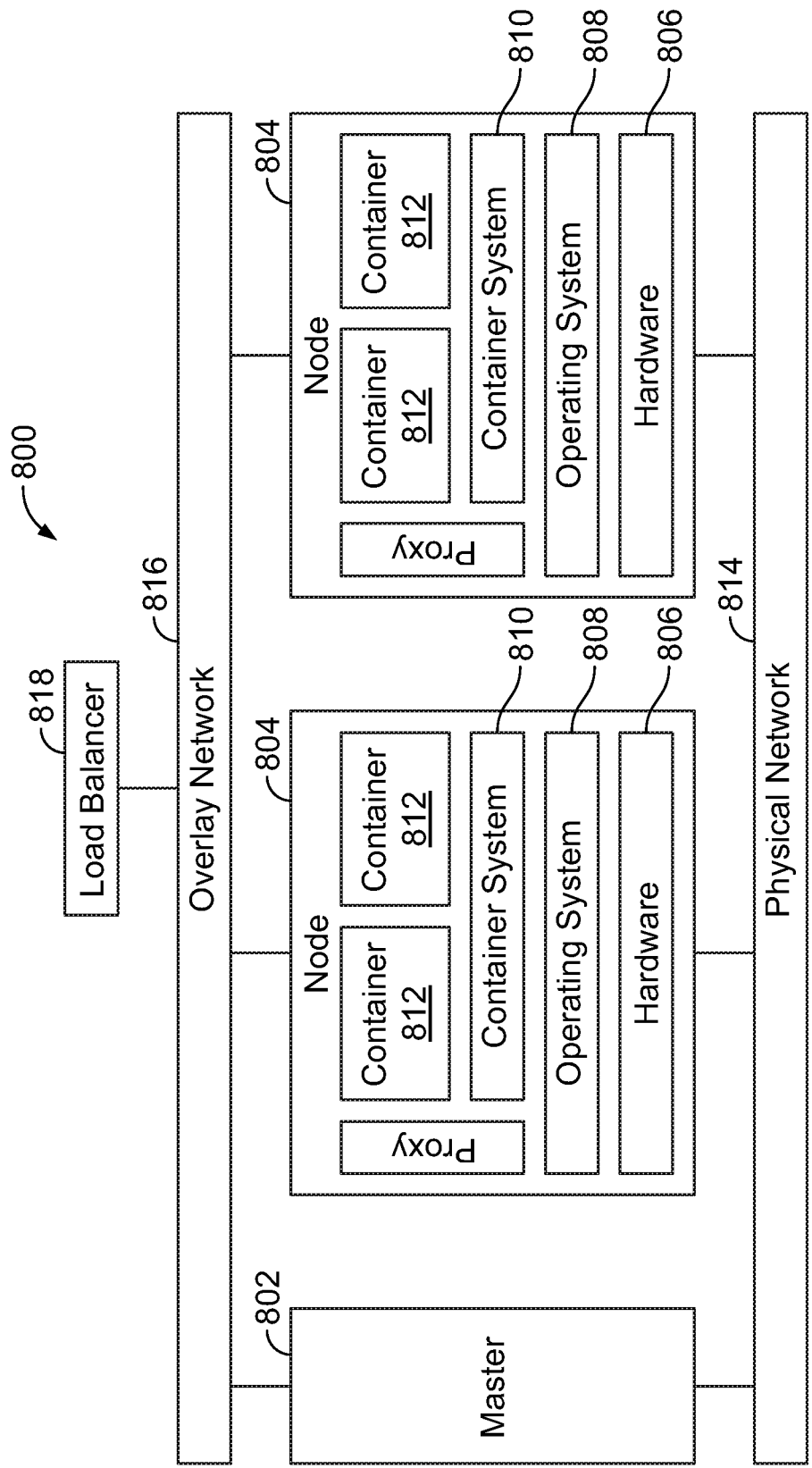
FIG. 8 is a block diagram of a system executing the commerce engine of FIG. 1.

FIG. 8 is a block diagram of a system 800 executing the commerce engine 106 of FIG. 1. FIG. 8 illustrates a system for running and coordinating containerized applications across a cluster of machines. The system 800 includes individual physical or virtual machines that use a shared network to communicate between each server. A master server 802 coordinates operations of the cluster by exposing an API for users and clients, health checking other servers, scheduling work, and facilitating communication between other components. Node servers 804 accept and run workloads using local and external resources. Each node server 804 includes hardware 806 (such as processors and memory, etc.) that supports an operating system 808 (such as Windows® or Linux®, etc.). Additionally, each operating system 808 executes a container system 810 to instantiate containers 812 help with isolation, management, and flexibility. The container system 812 creates and destroys these isolated containers 812 to adjust for the workload changes, network rule changes, and network traffic changes based on instructions received from the master server 802. Applications and services (e.g., the web/App interface manager 116, the gateway 118, the offer manager 120, the order manager 122, the user manager 124, and the commerce database 126, etc.) execute within these containers 812.

A physical network 814 connects the system 800 to external devices. The physical network 814 is connected to physical network adapters in the servers 802 and 804 and are responsible for placing packets onto the physical wire). An overlay network 816 is a combination of virtual network interfaces, bridges, and routing rules to facilitate communication between containers 812 that are instantiated on any one of the node servers 804. A load balancer 818 externally accesses and connects to a load balancer resource of a cloud provider (AWS®, Azure®, OpenStack®, CloudStack®, and Google Compute Engine®, etc.).

Figure 9:
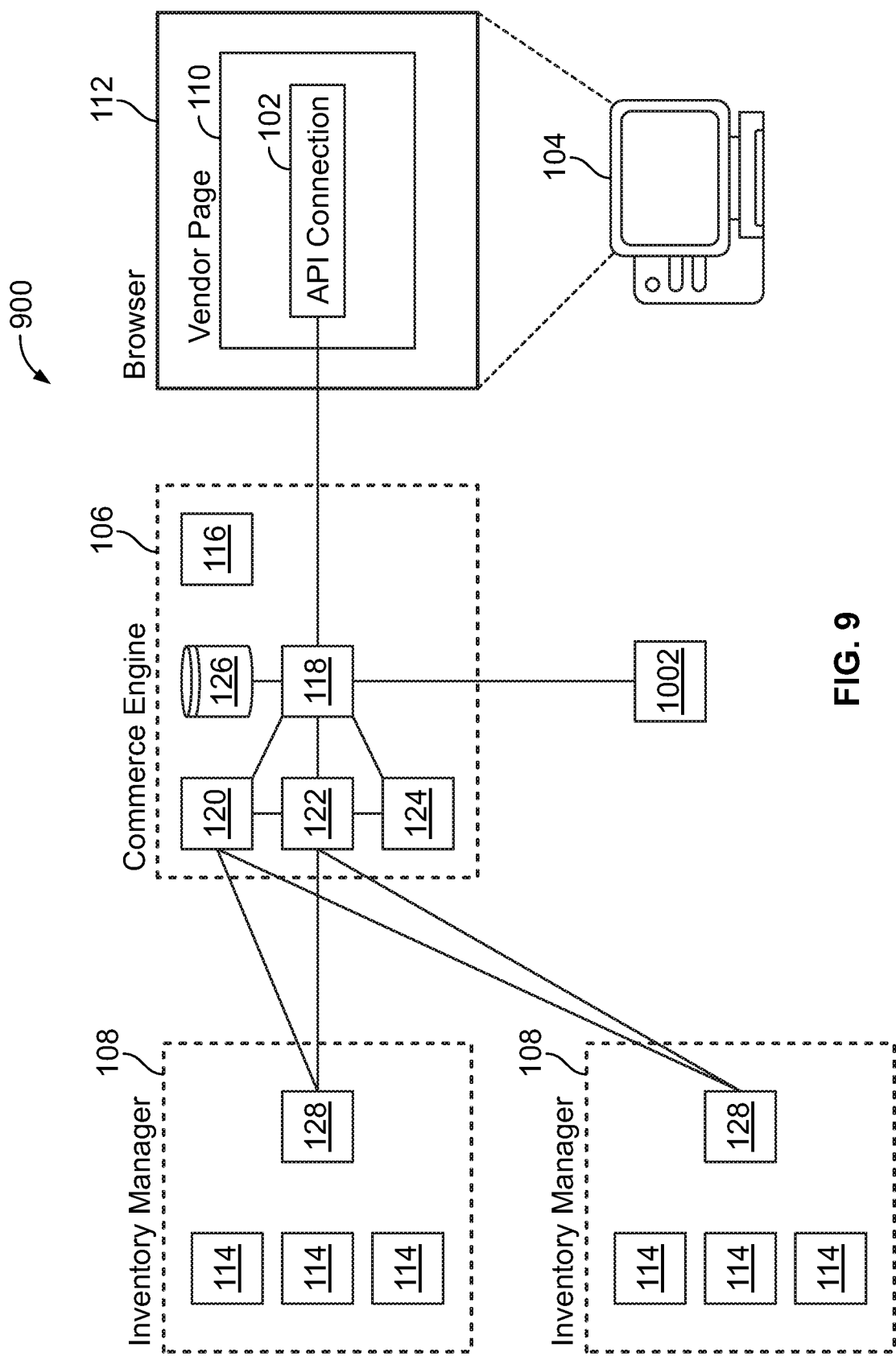
FIG. 9 is a block diagram depicting the network environment of FIG. 1, including a commerce engine interfacing with a payment engine in accordance with the teachings of this disclosure.

Similar to FIG. 1 and the associated description above, FIG. 9 is a block diagram depicting a network environment 900, which includes at least all or portions of the structure and functionality of the network environment 100. The network environment 900 also includes a payment engine 1002 which interfaces with the commerce engine 106, and in particular at least the gateway 118 and the order manager 122 of the commerce engine 106, and at least according to the methods set forth in the FIGS. 10 and 12, described below. Likewise, the structure and functionality set forth in FIGS. 2-8 and the respective portions of the description above can also be carried out within network environment 900, in a similar fashion and in other ways, as one of ordinary skill would understand.

The payment engine 1002 can be directly provided by a particular credit card company, but preferably the payment engine 1002 is provided by/hosted by a payment source agnostic payment provider such as Spreedly® or Tokenex®. In order to implement the payment engine 1002 of the payment provider, the payment engine 1002 is configured to accept a vault credit card (CC) token through an API of the payment engine 1002, providing interfacing with the payment engine 1002. Specifically, the payment engine 1002 comprises a data or credit card (CC) token vault including a secure database, which can have a pair of linked tables. This credit card (CC) token vault can alternatively be located in the cloud. A mapping between the tokenized credit card data and the corresponding token is stored in the token vault. The token is then returned to the commerce engine 106 to be stored until needed.

Figure 10:
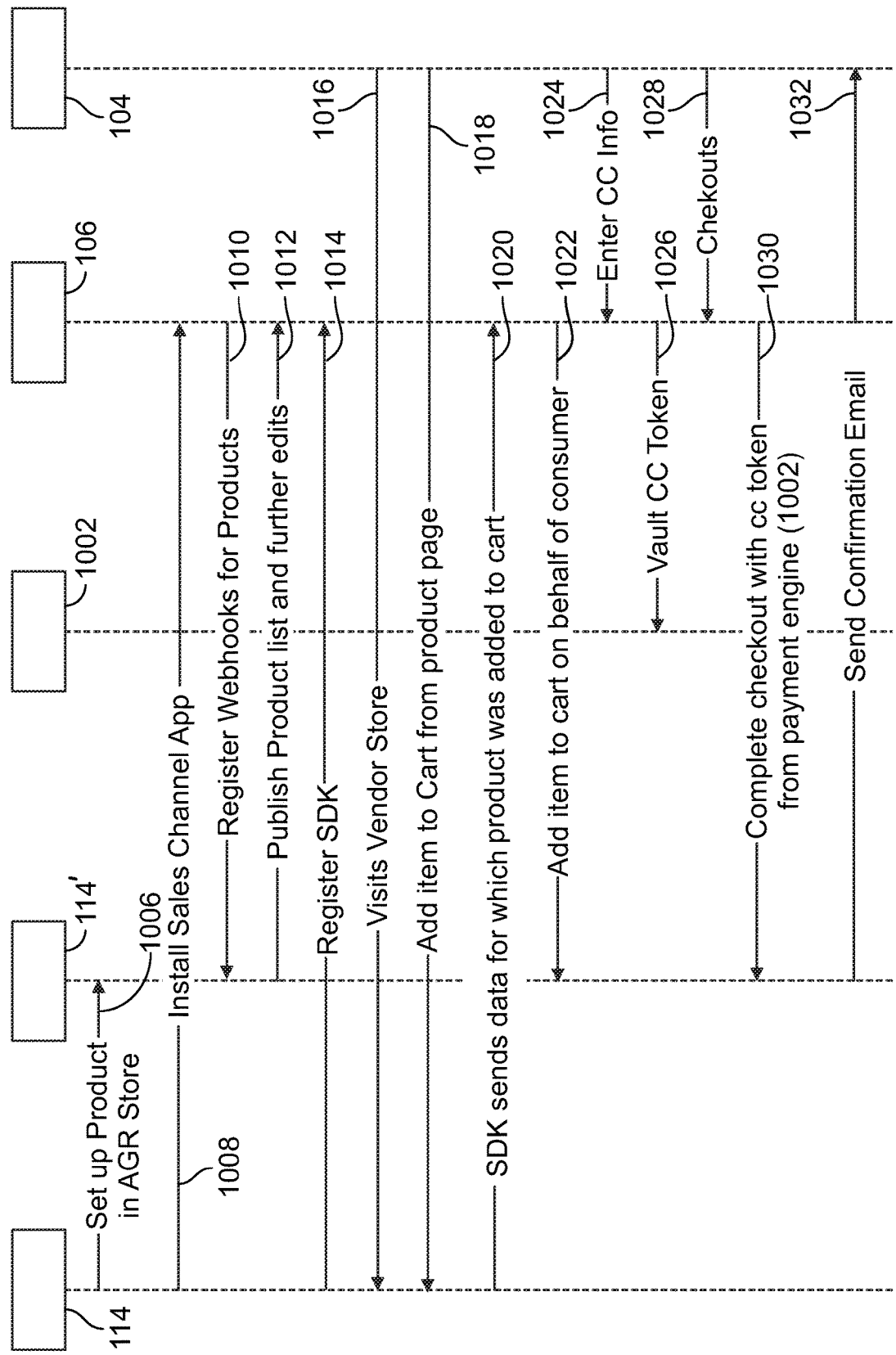
FIG. 10 is a flow diagram of a method to distribute fungible and non-fungible items incorporating the commerce engine of FIG. 9.

Also referring to FIG. 10, a further exemplary method to distribute fungible and non-fungible items incorporating the commerce engine of FIG. 9 is shown. Specifically, as set forth in FIG. 10, the network environment 900 includes the vendor 114, which can represent a number of different vendors 114 shown in FIG. 9. As further set forth in FIG. 10, the network environment 900 can also include a multi-vendor aggregator (AGR) engine 114' which allows a plurality of vendors 114 to set up and offer the vendors' 114 items/products/goods through the vendor aggregator (AGR) engine 114'. One form of the vendor(s) 114 depicted in FIG. 9 can include a multi-vendor aggregator (AGR) engine 114'. Further, one example of the vendor aggregator (AGR) engine 114' can include Shopify®. As further shown in FIG. 10, the network environment 900 includes the payment engine 1002 (as is described above), the commerce engine 106 (as is described above), and a first customer's computing device 104 (as is described above).

The first several steps set forth in FIG. 10 are provided to configure the network environment 900 to carry out the functionality set forth in the preceding and below exemplary embodiments. Specifically, at step 1006, the vendor(s) 114 transmits their items/products/goods to the AGR engine 114' in order to be offered for sale through the AGR engine 114'. For example, proper registration of the vendor(s) 114 information can include name, address, contact, account information (for crediting sales/debiting returns), item name/SKUs, item images, etc., to be transmitted to the AGR engine 114' by the vendor(s) 114.

At step 1008, the vendor(s) 114 transmits a sales channel application to the commerce engine 106, for installation and execution at and by the commerce engine 106. The sales channel application creates a path to the vendor(s)' 114 items being offered by the AGR engine 114' or directly through the vendor(s)' 114 website/App and pages therein, through the commerce engine 106. At step 1010, the commerce engine 106 transmits a communication to the AGR engine 114' to register webhooks associated with the commerce engine 106 and the sales channel app, allowing for real-time data about at least offers and products, and all other associated data to be sent back and forth between at least the commerce engine 106 and the AGR engine 114'. At step 1012, the AGR engine 114' transmits a products to publish listing, including all associated data, to the commerce engine 106. Edits to the products to publish listing, including all associated data, can also be transmitted from the AGR engine 114' to the commerce engine 106 from time to time. Alternatively, step 1012 can comprise a transmission to the commerce engine 106 that the products to publish listing and/or edits thereto (and associated data) are ready to be published by and at the AGR engine 114' itself. At step 1014, the vendor(s) 114 transmits a commerce engine 106 specific software development kit (SDK) registration communication to the commerce engine 106, once the SDK is installed and is ready at the vendor(s). The SDK is configured to generate the token(s) described herein. Once the SDK is installed at the vendor(s) 114 and registered at the commerce engine 106, a purchaser is ready to start using the network environment 900 to establish and use the universal shopping cart, through his/her own computing device 104.

Thus, at steps 1016 and 1018, the purchaser's computing device 104 transmits communications to the vendor(s) 114 (and vice verse), to visit the vendor(s) 114 website App and product selection web/App page(s), and to add an item (good) to the cart, the cart being generated by the SDK installed and running at the vendor(s) 114 system, as described above in relation to FIGS. 1-8. At step 1020, the vendor(s) 114 system, and SDK running therein, then transmits the token, including respective data associated with the item/product/good that was added to the cart, to the commerce engine 106, also as described above in relation to FIGS. 1-8. At step 1022, in the exemplary embodiment set forth in FIG. 10, in response to the transmission to the commerce engine 106 that the item was placed in the cart by the purchaser through the purchaser's computing device 104, the commerce engine 106 then transmits to the AGR engine 114' to place the selected item in the cart, and place the item on hold, as described above in relation to FIGS. 1-8.

In the context of the network environment 900 of FIG. 9, at step 1024, the purchaser through their computing device 104 enters their credit card/other payment information, which the computing device 104 then transmits to the commerce engine 106. At step 1026, the commerce engine 106 transmits a vault credit card (CC) token through the API of the payment engine 1002 to the payment engine 1002. The token is then returned to the commerce engine 106 to be stored until needed for a transaction. At step 1028, the purchaser's computing device 104 transmits an instruction to the commerce engine 106 to purchase the item(s) in the universal shopping cart and "checkout," and at step 1030, the commerce engine 106 then transmits an instruction to the AGR engine 114' to complete the checkout and purchase the item(s) in the cart, along with the vault CC token, and the AGR engine 114' then processes the order of the item(s) using the vault CC token, ships/transmits the items to the purchaser (depending on whether the items are fungible or non-fungible) and then sends a confirmation communication from the AGR engine 114' to the computing device 104 to confirm the order. Various other communications may then follow from the AGR engine 114' and/or a shipping company to the computing device 104 regarding status of shipping and delivery of the item(s), as is well known in the art. At step 1032, the AGR engine 114' can then transmit a confirmation communication to the computing device 104 confirming that the transaction has been completed, along within standard transaction confirmation information, which can take place via email, SMS transmission, or other methods.

Figure 11A:
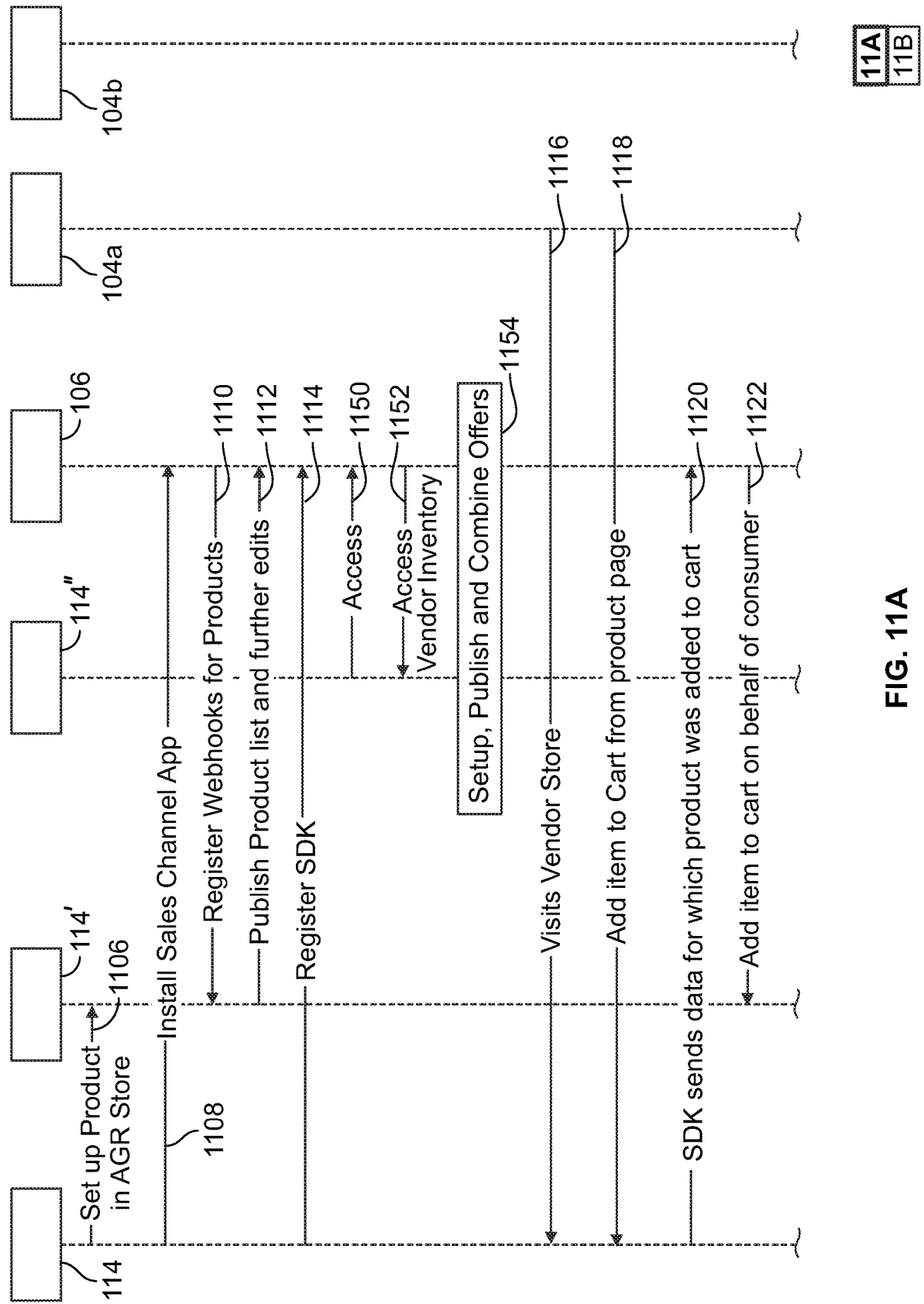
FIGS. 11A and 11B illustrate a flow diagram of a method to distribute fungible and non-fungible items incorporating the commerce engine of FIGS. 1 and 9.
Figure 11B:
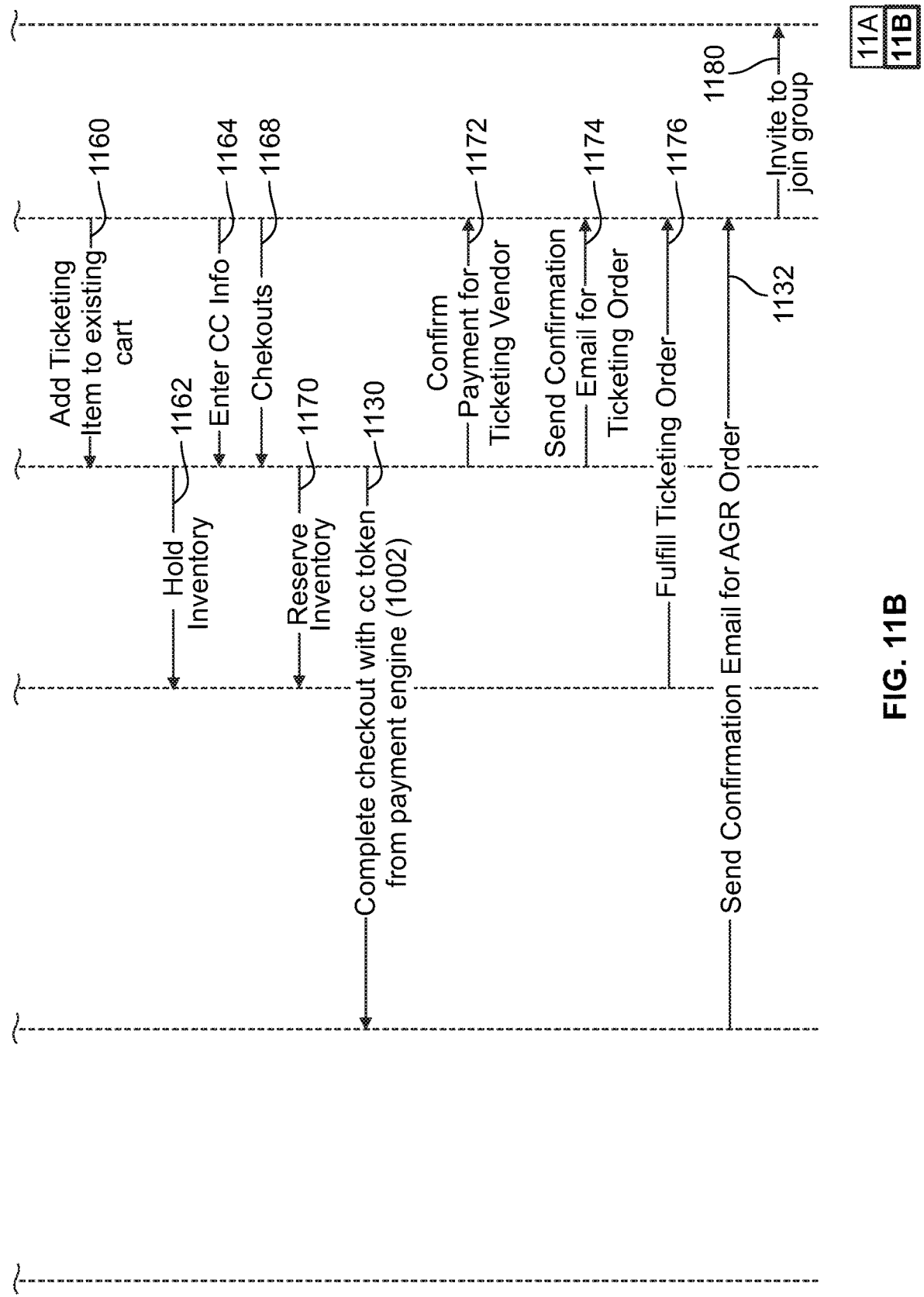

Referring to FIGS. 11A and 11B, a further exemplary method to distribute fungible and non-fungible items incorporating the commerce engine 106 of FIG. 9 is shown. Specifically, as set forth in FIG. 11, the network environment 900 includes the vendor 114, which can represent a number of different vendors 114 shown in FIG. 9. As further set forth in FIG. 11, the network environment 900 can also include a first multi-vendor aggregator (AGR) engine 114' and a second multi-vendor aggregator (AGR) engine 114" which both may allow a plurality of vendors 114 to set up and offer the vendors' 114 items/products/goods through the first and second AGR engines 114', 114". As set forth above, one form of the vendor(s) 114 depicted in FIG. 9 can include multi-vendor aggregator (AGR) engines 114', 114'. Further, another example of the vendor aggregator (AGR) engines 114', 114" can include an event ticket aggregator, such as Ticketmaster®.

Similar to the exemplary embodiment of FIG. 10, the first several steps set forth in FIG. 11A are provided to configure the network environment 900 to carry out the functionality set forth in the preceding and below exemplary embodiments. Specifically, at step 1106, the vendor(s) 114 transmits their items/products/goods to the AGR engine 114' (and could also do so in relation to AGR engine 114") in order to be offered for sale through the AGR engine 114' (and AGR engine 114"). For example, proper registration of the vendor(s) 114 information can include name, address, contact, account information (for crediting sales/debiting returns), item name/SKUs, item images, etc., to be transmitted to the AGR engine 114' (and AGR engine 114") by the vendor(s) 114.

At step 1108, the vendor(s) 114 transmits a sales channel application to the commerce engine 106, for installation and execution at and by the commerce engine 106. The sales channel application creates a path to the vendor(s)' 114 items being offered by the AGR engine 114' (and could do so with AGR 114" as well, as suggested above and below herein) or directly through the vendor(s)' 114 website/App and pages therein, through the commerce engine 106. At step 1110, the commerce engine 106 transmits a communication to the AGR engine 114' (AGR engine 114") to register webhooks associated with the commerce engine 106 and the sales channel app, allowing for real-time data about at least offers and products, and all other associated data to be sent back and forth between at least the commerce engine 106 and the AGR engine 114' (AGR engine 114"). At step 1112, the AGR engine 114' (AGR engine 114") transmits a products to publish listing, including all associated data, to the commerce engine 106. Edits to the products to publish listing, including all associated data, can also be transmitted from the AGR engine 114' (AGR engine 114") to the commerce engine 106 from time to time. Alternatively, step 1112 can comprise a transmission to the commerce engine 106 that the products to publish listing and/or edits thereto (and associated data) are ready to be published by and at the AGR engine 114' (AGR engine 114") itself. At step 1114, the vendor(s) 114 transmits a commerce engine 106 specific software development kit (SDK) registration communication to the commerce engine 106, once the SDK is installed and is ready at the vendor(s). The SDK is configured to generate the token(s) described herein. The SDK is now installed at the vendor(s) 114 and registered at the commerce engine 106 for that vendor(s).

As mentioned, in the exemplary embodiment of FIGS. 11A and 11B in the context of the network environment 900, the AGR engine 114" can be provided for a non-fungible items aggregator, such as an event ticket aggregator/broker. In such an example, at step 1150, the AGR engine 114" requests, via communication transmission, access from and is provided access to the commerce engine 106, and the various sub-systems and data stored within the commerce engine 106. Through this communication(s), the operator of the AGR engine 114" can identify and transmit to the commerce engine 106 which vendor(s) 114 items (and respective information about such items) the operator of the AGR engine 114" wishes to make available to the commerce engine 106 users/purchasers, such as to the user/purchaser operating computing device 104a. As a part of this identification, at step 1152, the commerce engine 106 is given access to and access the item inventory of the AGR engine 114".

When all such items are identified to the commerce engine 106 by the AGR engine 114", at step 1154, the commerce engine 106, in communication with the AGR engine 114", sets up, publishes and combines offers for such items from the AGR engine 114". As a part of step 1154 and combining offers, the commerce engine 106 determines if 1) any of the vendors 114 making items available through the AGR engine 114" are the same vendors 114 making items available through the AGR engine 114' and/or are the same as the vendors 114 making items available directly using the commerce engine 106 to distribute items, and/or 2) are any of the items being made available through any of the AGR engine 114', the AGR engine 114", and/or the vendors 114 using the commerce engine 106 to distribute items are the same items. If any of the vendors 114 are the same, the commerce engine 106 generates a common unified format and layout for presentation of that vendors' items for viewing through the computing device 104a, grouping such items together for presentation for such vendor 114 (by vendor). If any of the items are the same or closely related, likewise the commerce engine 106 can generate common availability information (summing all units available from all vendor sources) for the same items, and can generate a grouped presentation for closely related items. In this way, purchasers do not end up viewing the same items (offers for items) from the same vendors 114 multiple times in the same set of interface screens at the computing device 104a. A purchaser is now ready to start using the network environment 900 to establish and use the universal shopping cart, through his/her own computing device 104a.

In the exemplary embodiment of FIG. 11A, the next four steps, 1116, 1118, 1120, and 1122 are the same as steps 1016, 1018, 1020, and 1022 from FIG. 10, as described above in relation thereto. These four steps 1116, 1118, 1120, and 1122 place items within the universal shopping cart from the AGR engine 114' in a similar manner as performed within steps 1016, 1018, 1020, and 1022, as described in relation to FIG. 10. At step 1160, computing device 104a, on behalf of the purchaser, transmits a request to the commerce engine 106 for the commerce engine 106 to add a non-fungible item(s), such as an event ticket, to the universal shopping cart that already has items therein from prior steps 1116, 1118, 1120, and 1122. The inventory for such non-fungible items is already stored within the commerce engine 106 as a result of at least steps 1150, 1152, and 1154, and the connection is established (along with the associated web/App pages having the non-fungible items offer) in such a manner which causes direct communication between the computing device 104a and the commerce engine 106 without having to communicate with the AGR engine 114". At step 1162, the commerce engine 106 then transmits a request to the AGR engine 114" to place the selected items on hold, and the AGR engine 114' then places such cart added items on hold. At step 1164, the commerce engine 106 transmits a prompt to the computing device 104a to request the purchaser to enter their payment information, such as credit card information. Once entered, along with other identification and/or delivery information, at step 1168, the computing device 104a transmits at the purchaser's direction, a checkout command to the commerce engine 106. In response, at step 1170, the commerce engine 106 transmits a reserve inventory communication to the AGR engine 114" to remove the "hold" on the items and reserve the items instead. With respect to the other items within the cart for which the offer for such items was provided by the AGR engine 114', at step 1130, a similar step is performed as step 1030 in relation to FIG. 10 and the respective description above.

At step 1172, the commerce engine 106, via a connection to a payment confirmation service engine (not shown), such as Stripe®, transmits a confirmation communication to the computing device 104a, confirming payment to the purchaser. At step 1174, the commerce engine 106 can then transmit a confirmation communication to the computing device 104a confirming that the transaction has been completed, along within standard transaction confirmation information, which can take place via email, SMS transmission, or other methods. At step 1176, the commerce engine 106 then transmits an instruction to the AGR engine 114" to transmit the non-fungible items to the computing device 104a or ship such non-fungible items to the purchaser, and the AGR engine 114" then performs this action. At step 1132, the AGR engine 114' can also transmit a confirmation communication to the computing device 104a confirming that the transaction has been completed for the items offered by the AGR engine 114', along within standard transaction confirmation information, which can take place via email, SMS transmission, or other methods. Various other communications may then follow from the AGR engine 114' and/or a shipping company to the computing device 104a regarding status of shipping and delivery of the item(s), as is well known in the art.

At step 1180 in FIG. 11B, computing device 104a for a first purchaser can send a communication to a second computing device 104b for a second purchaser for the first purchaser to invite the second purchaser to join the group which the first purchaser is a part of. Specifically, the communication comprising the invitation can include the token referred to above within the present description. As an example, additionally referring to FIG. 13, the token can comprise a link 1302, which the first purchaser can copy using the computing device 104a and send to the second computing device 104b (and to the second purchaser) via email, SMS communication, or other known social communication methods. By using/clicking on this link, the second computing device 104b and the second purchaser will be directed to the current state of the universal shopping cart for the first purchaser, by either being directed to the commerce engine 106 and a respective web/App page providing information on the cart and items therein or to the AGR engine 114' or vendor 114 and a respective web/App page also providing information on the cart and items therein. The second purchaser can then choose the items as well and become a part of the group, such as a group of event goers when the items are event tickets to an event.

Figure 12:
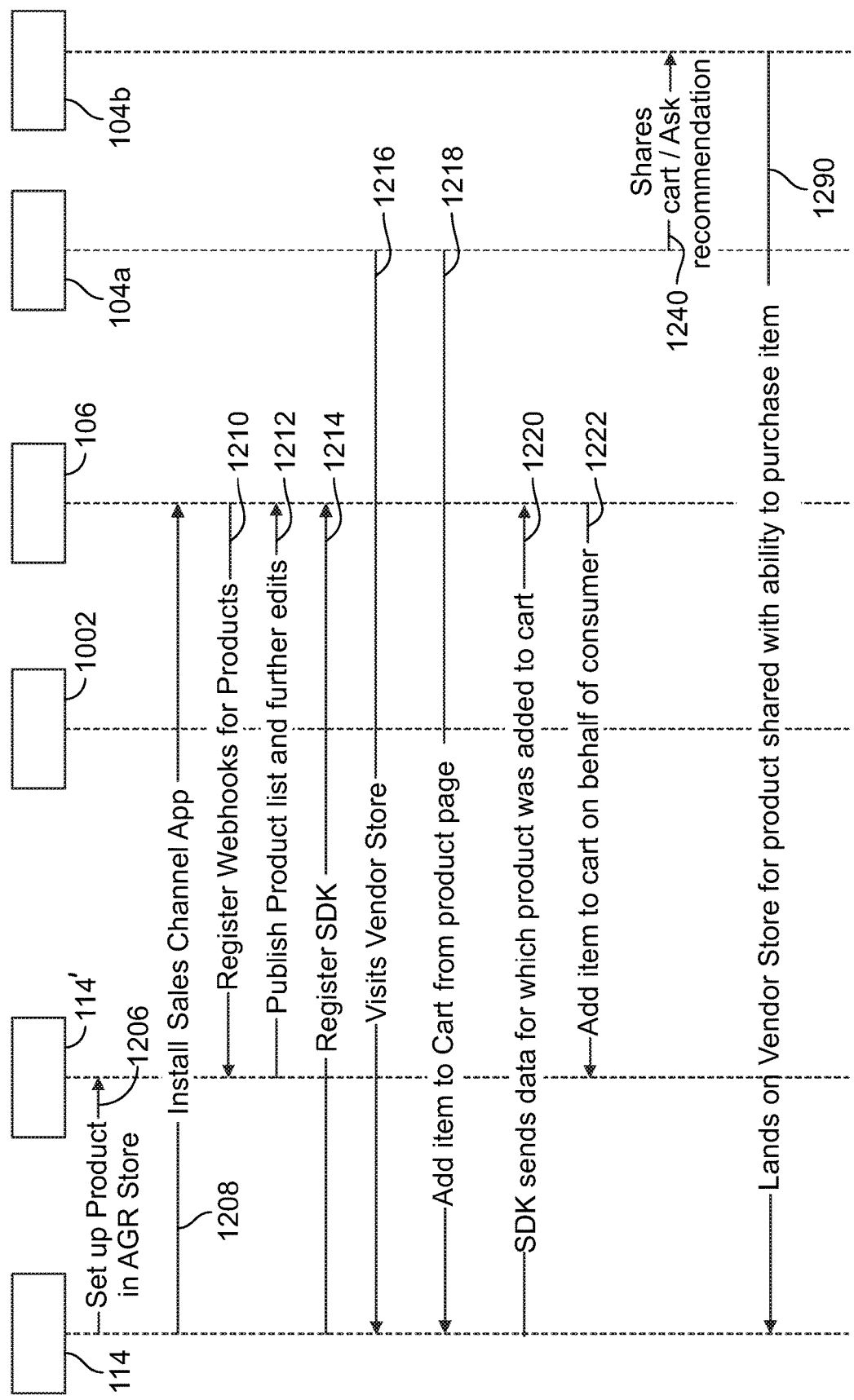
FIG. 12 is a flow diagram of a method to distribute fungible and non-fungible items incorporating the commerce engine of FIG. 9.

Referring to FIG. 12, a further exemplary method to distribute fungible and non-fungible items incorporating the commerce engine 106 of FIG. 9 is shown. In the exemplary embodiment of FIG. 12, the first nine steps, 1206, 1208, 1210, 1212, 1214, 1216, 1218, 1220, and 1222 are the same as steps 1006, 1008, 1010, 1012, 1014, 1016, 1018, 1020, and 1022 from FIG. 10, as described above in relation thereto. Step 1240 generally represents various ways that the commerce engine 106 allows the computing device 104a and the purchaser to interact with others—other group members, other potential purchasers, and/or other friends of the purchaser. Specifically, when the commerce engine 106 generates a web page/interface/interacts with an App on the computing device 104a, the web page/interface/App provides one of more sharing interaction options for the purchaser to select in order to interact with others regarding the items within present state of the cart. Specifically, referring to FIG. 13, a confirmation of deletion interface window 1300, in the form of a drawer, is presented on the computing device 104a when the purchaser previously selected to delete an item from their universal cart. The deletion interface window 1300 provides the purchaser with a delete option 1306, which when selected, will transmit to the commerce engine 106 to delete the item from the purchaser's universal cart. The deletion interface window also provides the purchaser with ability to share the cart with others in a way which elicits feed back from such others. Specifically, the purchaser can copy the link 1302 set forth within the interface screen of FIG. 13, using the computing device 104a and send the link 1302 to the second computing device 104b (and to the second purchaser) via email, SMS communication, or other known social communication methods.

Referring back to FIG. 12, in one further exemplary embodiment, the commerce engine 106 can include all of the features of one or multiple vendors, allowing purchasers to directly communicate through their computing devices without a separate vendor website/App being a part of the network environment 900. In such an embodiment, the commerce engine 106 receives a request from the computing device 104a to add an item to the cart from the inventory within the commerce engine 106. The purchaser can then transmit the token for the established cart from the computing device 104a to the second computing device 104b. The other purchaser/second computing device 104b can then transmit the token to the commerce engine 106 after the second computing device 104b receives the token from the first computing device 104a in order to view the contents of the cart established at the commerce engine 106.

Referring back to FIG. 12 and step 1290 therein, by using/clicking on one form of the link 1302, the second computing device 104b and the second purchaser will be directed to the vendor 114 and a respective web page/interface/App screen providing information on the cart and the goods therein which were selected by the purchaser. The second user can then choose the goods as well and become a part of the group of purchasers.

Figure 13:
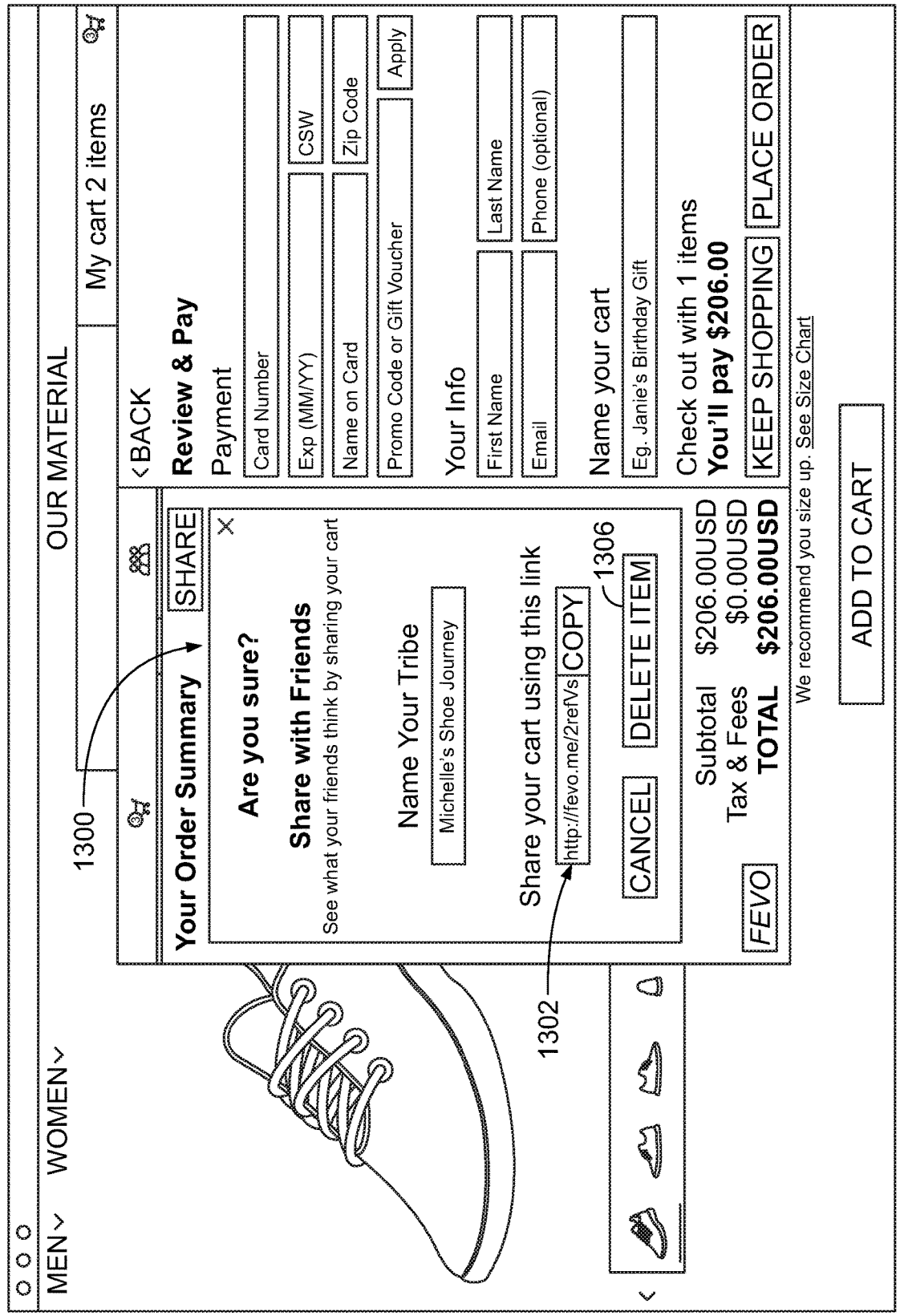
FIG. 13 is an interface screen depicting a part of the method of FIG. 12, incorporating the commerce engine of FIGS. 1 and 9.

Referring to step 1240 of FIG. 12 and FIG. 13, in another form of the link 1302, after being received by the second computing device 104b by the other individual, when the other individual uses the link 1302, the second computing device 104b is taken to an interface screen such as a comments/likes interface screen 1500, shown in FIG. 15. Alternatively, the commerce engine 106 can receive a communication from the computing device 104a to send the comments/likes interface screen 1500 shown in FIG. 15 to the second computing device 104b. The comments/likes interface screen 1500 shown in FIG. 15 also comprises like options 1502 and commenting fields 1504, for the other individual to select to like/provide comments within, respectively, for each of the items within the current state of the purchaser's universal cart. The "likes" and comments data entered by the other individual(s) is then communicated by the commerce engine 106 to the purchaser 104a through the computing device 104a. In one exemplary embodiment, the "likes" and/or comments data provided by the other individual can be presented within the cart, as shown in FIG. 15. In another exemplary embodiment, the "likes" and/or comments data provided by the other individual can be presented outside of the universal cart, as shown in FIG. 15.

Figure 14:
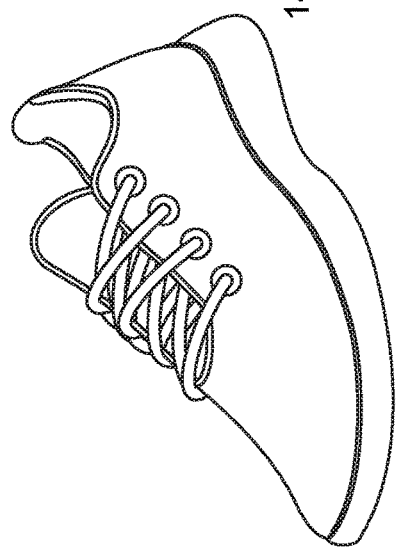
FIG. 14 is a further interface screen depicting a further part of the method of FIG. 12, incorporating the commerce engine of FIGS. 1 and 9.

Referring to FIG. 14, with reference to step 1240 of FIG. 12, a messaging interface screen 1400 is provided to the computing device 104a, which provides message options 1402 to select from to send to computing device 104a and to the other individual(s). Likewise, the second computing device 104b can receive the cart and messaging for viewing either through use of the link 1404 communicated to the second computing device 104b by the first computing device 104a, or through the commerce engine 106 as set forth above herein.

Figure 16:
FIG. 16 is a further interface screen depicting a further part of the method of FIG. 12, incorporating the commerce engine of FIGS. 1 and 9.
Figure 17:
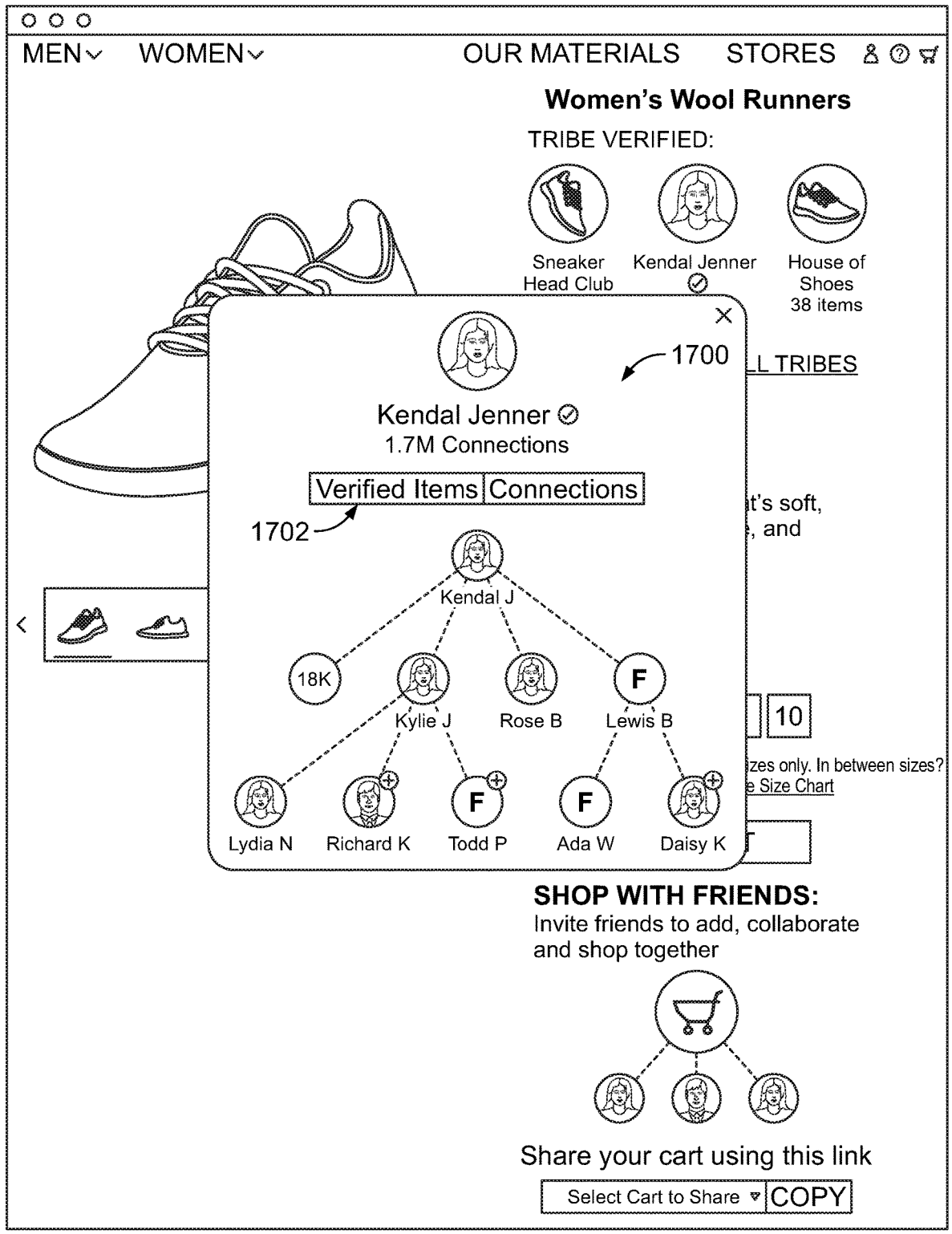
FIG. 17 is a further interface screen depicting a further part of the method of FIG. 12, incorporating the commerce engine of FIGS. 1 and 9.

Referring to FIG. 16, the commerce engine 106 of FIGS. 1 and 9 can be interfaced with an influencer database. Specifically, influencer databases can comprise "verification" ratings/likes/dislikes of one or more lead influencers and their followers. An influencer and their followers can be considered as an influencer group or tribe. If a verification has been performed by an influencer group for an item/good, then that item/good is considered "verified." This data can be an important marketing tool for influencing purchasing decisions. FIG. 16 shows a product interface screen 1600 transmitted to the computing device 104a from the commerce engine 106, the product interface screen 1600 having an influencer group or "tribe" listing 1604 of influencer groups showing the leading influencer person of organization for each influencer group. The product interface screen 1600 also comprises a "verify this item" option 1608, which when selected, the commerce engine 106 determines whether the particular item or good 1620 shown has been verified by a particular influencer group, and the results of such verification. A further "see all tribes" or see all influencer groups option 1612 is also provided, which when selected allows the purchaser through the computing device 104a to review whether each influencer group has verified the item 1620 and the results of such verification. Referring to FIG. 17, an influencer group connection interface screen 1700 is shown, which is generated when an influencer group is selected within the product interface screen 1600 of FIG. 16. The influencer group connection interface screen 1700 shows the "connections" hierarchy of the influencer group. The influencer group connection interface screen 1700 also sets forth a verified items option 1702, which when selected through the computing device 104a shows a listing of all verified items by that particular influencer group and the results of such verification, which can influence the purchaser to add/keep/remove items from the universal cart. The purchaser can also select to see the verification results for a product by "all tribes" or all influencer groups together/at one time.

In this application, the use of the disjunctive is intended to include the conjunctive. The use of definite or indefinite articles is not intended to indicate cardinality. In particular, a reference to "the" object or "a" and "an" object is intended to denote also one or a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The tribe influencer data and verification data can be used to see connections between purchasers that are identified within the commerce engine 106 database (in groups or otherwise) and purchasers which are also within one or more tribes within the tribe/influencer database. Such purchasers in both and the respective connections can be used to suggest groups for the purchaser to be a part of and/or other purchasers who the purchaser may want to invite to their cart/group, relative to particular items or without reference to any particular items.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. In a system for managing a universal ecommerce cart for facilitating selecting items by a group of orderers joining the group at different times, comprising:

a commerce engine configured to receive a token through an application programming interface, wherein when the token is received, the commerce engine generates a universal shopping cart associated with an orderer via the token;

wherein the commerce engine communicates with a computing device of the orderer via the token from within a vendor page of a vendor application through the application programming interface, and wherein the token is configured to link to a web application to dynamically rewrite the vendor page to provide the universal shopping cart having an offer for the items associated with the vendor application, wherein the commerce engine is configured to provide a graphical user interface illustrating the universal shopping cart having the offer;

wherein the commerce engine is further configured to generate a unique identifier for the universal shopping cart associated with the orderer comprising the present state of the universal cart;

wherein the commerce engine is configured to generate a link to the universal shopping cart to enable an additional orderer to receive a notification of the offer in the universal shopping cart, and wherein the commerce engine is configured to add the additional orderer to the group of orderers based on a response from the additional orderer to the notification;

wherein the graphical user interface is configured to display the universal shopping cart having the offer to the additional orderer when the commerce engine receives a response to the notification from the additional orderer, wherein the graphical user interface displays the items within the universal shopping cart and grants access the additional orderer access to select one or more of the items therein;

wherein the commerce engine comprises a commerce database configured to store information on the orderer and/or the additional orderer, wherein the graphical user interface enables the orderer and/or the additional orderer to interact with and elicit feedback from other orderers, wherein the system further comprises an inventory manager operatively connected to a vendor associated with the one or more items in the universal shopping cart having the offer, and wherein the commerce engine is configured to send an instruction to the inventory manager to reserve a selected item of the one or more of the items upon receiving a selection from the orderer and/or the additional orderer.

2. The system of claim 1 wherein the token comprises an HTML iFrame tag.

3. The system of claim 2 wherein the system further comprises a vendor computer system having a token generator installed therein to generate the token for the universal shopping cart.

4. The system of claim 1 wherein the commerce engine further comprises an interface manager to either provide the graphical interface having the token for the universal shopping cart to the computing device or communicate the token to an App operating on the computing device.

5. The system of claim 4 wherein the commerce engine further comprises a user manager to manage information related to the customers and groups, including group composition, user profiles, and commerce attribution, to retrieve customer information.

6. The system of claim 5 wherein the commerce engine further comprises an offer manager to retrieve offers associated with a vendor page from a plurality of remote inventory managers of disparately coded vendor sites.

7. The system of claim 6 herein the commerce engine further comprises an order manager to communicate with the remote inventory managers of the disparately coded vendor sites, to manage ordering the items from the disparately coded vendor sites.

8. The system of claim 7 wherein the order manager is to temporarily place an available item on hold status in response to an offer being added to the universal shopping cart, by sending a communication to the remote inventory managers of the disparately coded vendor site.

9. The system of claim 8 wherein the interface manager, the offer manager, the order manager, and the user manager are independently instantiated executables to run on virtual instances of operating environments.

10. The system of claim 1 wherein prior to the commerce engine receiving the token through the application programming interface, the token was previously coded into programming code of the vendor website or App.

11. The system of claim 1 wherein the additional orderer is provided with a notification of the offer in the universal shopping cart via a communication initiated by a previous orderer in the group.

12. The system of claim 11 wherein the notification comprises the unique identifier.

13. The system of claim 12 wherein the unique identifier comprises a share link.

14. The system of claim 11 wherein the communication initiated by the previous orderer in the group is sent by at least one of the commerce engine and the previous orderer's personal communication device using a personal electronic communication medium.

15. The system of claim 14 wherein the personal electronic communication medium comprises at least one of social media, e-mail, and SMS message.

16. The system of claim 1, wherein when the commerce engine adds one or more items to the universal shopping cart, the commerce engine saves and stores the state of the universal shopping cart with a further unique identifier, wherein the further unique identifier identifies a different version of the contents of the unique universal shopping cart for the group of orderers, and commerce engine to receive a request to communicate the further unique identifier to an electronics device associated with one or more members of the group or with an electronic device associated with a potential orderer not within the group of orderers.

17. The system of claim 1 wherein the commerce engine comprises an offer manager and an order manager, wherein the inventory manager comprises a vendor manager, wherein the vendor manager is to translate between the offer manager and the order manager without the offer manager and the order manager requiring specific protocols to access data from the individual inventory management systems of one or more vendors, and wherein the commerce engine via the inventory manager swap and shuffle items based on an evaluation score calculated by the commerce engine.

18. The system of claim 1 wherein the commerce engine comprises a vendor wherein the commerce engine receives a request from the computing device to add an item to the cart, and wherein a second computing device transmits the token to the commerce engine after the second computing device receives the token from the first computing device in order to view the contents of the cart established at the commerce engine.

19. The system of claim 1 wherein the commerce engine is to transmit a communication to the inventory manager associated with the offered item to place a hold on the at least one of the offered item with the associated inventory manager, to change the status of the at least one of the offered item to a hold status.

20. The system of claim 19 wherein in response to the additional orderer responding to the notification:
a notification response communication is received by the commerce engine; and
the commerce engine to send an additional purchase communication to the inventory manager associated with the vendor of the item, to place a hold on at least one additional item of the offered item, and to change the status of the at least one additional item of the offered item to a hold status.

21. The system of claim 1 wherein the second computing device receives and executes the token, the second computing device receives a comments/likes interface screen for the other individual to select to like/provide comments within comment fields regarding each item within the current state of the orderer's universal shopping cart.

22. The system of claim 21 wherein the "likes" and/or comments data entered by the other individual is received by the commerce engine, and wherein the commerce engine is to generate suggested items and/or suggested groups based on the received "likes" and/or comments data.

23. A method of managing a universal ecommerce shopping cart for facilitating ordering of fungible and non-fungible items by a group of orderers requesting ordering at different times, comprising the steps of:
receiving by a commerce engine a token from within a vendor interface of a vendor web site or vendor App through an application programming interface, and when the token is received, generating by the commerce engine a universal shopping cart having an offer for the items associated with the vendor interface via the token;
dynamically rewriting the vendor website or vendor App via the token to provide the universal shopping cart by linking the token to a web application and communicating with a computing device of an orderer via the token;
graphically displaying the universal shopping cart with the offer via the commerce engine;
generating by the commerce engine a unique identifier in the form of a link for the universal shopping cart associated with the present state of the universal shopping cart;
providing an additional orderer with a notification of the offer in the universal shopping cart, and adding by the commerce engine the additional orderer to the group of orderers in response to the additional orderer responding to the notification;
wherein in response to the additional orderer responding to the notification:
receiving by the commerce engine a notification response communication;
presenting, via the graphical user interface, the additional orderer an interactive control to select offered items from the universal shopping cart and
transmitting by the commerce engine an additional purchase communication to the inventory manager associated with the vendor of the items, to place a hold on at least one additional item of the offered items, and to change the status of the at least one additional item of the offered items to a hold status;
storing information on the orderer and/or the additional orderer in a commerce database; and
generating an interface window via the graphical user interface enabling the orderer and/or the additional orderer to interact with and elicit feedback from other orderers.

24. The method of claim 23 further comprising the steps of:
when the commerce engine adds one or more items to the universal shopping cart, saving and storing by the commerce engine the state of the universal shopping cart and generating a further unique identifier representative of the state of the universal shopping cart, wherein the further unique identifier identifies a different version of the contents of the unique universal shopping cart for the group of orderers; and
receiving by the commerce engine a request to communicate the further unique identifier to an electronic device associated with one or more members of the group or with an electronic device associated with a potential orderer not within the group of orderers.

25. The method of claim 23 wherein prior to the commerce engine receiving the token through the application programming interface, coding the token into programming code of the vendor website or vendor App.

26. The method of claim 23 further comprising the steps of:
transmitting by the commerce engine a communication to an inventory manager associated with the offered item;
placing by the inventory manager a hold on the at least one of the offered item with the associated inventory manager; and
changing by the inventory manager the status of the at least one of the offered item to a hold status.

27. The method of claim 26 wherein in response to the additional orderer responding to the notification, further comprising the steps of:
receiving by the commerce engine a notification response communication; and
transmitting by the commerce engine an additional purchase communication to the inventory manager associated with the vendor of the items, to place a hold on at least one additional item of the offered items, and to change the status of the at least one additional item of the offered items to a hold status.

\* \* \* \* \*